United States Patent
Kitamura et al.

(10) Patent No.: US 6,804,742 B1
(45) Date of Patent: Oct. 12, 2004

(54) SYSTEM INTEGRATED CIRCUIT

(75) Inventors: Tomohiko Kitamura, Hirakata (JP); Masataka Osaka, Osaka (JP); Tsutomu Sekibe, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 541 days.

(21) Appl. No.: 09/711,432

(22) Filed: Nov. 13, 2000

(30) Foreign Application Priority Data

Nov. 17, 1999 (JP) .......................................... 11-326776

(51) Int. Cl.$^7$ ............................................. G06F 13/36
(52) U.S. Cl. ..................................................... 710/312
(58) Field of Search .................................. 710/306–315

(56) References Cited

U.S. PATENT DOCUMENTS

| | | | | |
|---|---|---|---|---|
| 5,321,651 A | * | 6/1994 | Monk ...................... 365/189.01 |
| 5,345,580 A | | 9/1994 | Tamaru et al. |
| 5,349,666 A | * | 9/1994 | Adachi et al. ............... 713/300 |
| 5,444,722 A | * | 8/1995 | Tran .............................. 714/42 |
| 5,568,621 A | * | 10/1996 | Wooten ....................... 710/112 |
| 5,819,023 A | | 10/1998 | Klingler |
| 5,867,644 A | | 2/1999 | Ranson et al. |
| 5,903,911 A | * | 5/1999 | Gaskins ....................... 711/141 |
| 5,918,247 A | * | 6/1999 | Patel et al. .................. 711/138 |
| 5,953,263 A | | 9/1999 | Farmwald et al. |
| 6,078,977 A | * | 6/2000 | Klein ......................... 710/306 |

FOREIGN PATENT DOCUMENTS

| | | |
|---|---|---|
| EP | 893766 | 1/1999 |
| EP | 897151 | 2/1999 |
| JP | 05046430 A | 2/1993 |
| JP | 07253915 A | 10/1995 |

* cited by examiner

Primary Examiner—Paul R. Myers

(57) ABSTRACT

A system integrated circuit that identifies the cause of a malfunction even if the number of output terminals of a system LSI to be assigned to internal buses in the system LSI is strictly restricted. Comparators 11 to 15 are connected to any of a plurality of buses. Each comparator judges whether a certain expected value matches data transferred on a bus connected to the comparator. The selector unit 10 selects one of the plurality of buses in accordance with the judgement result of the comparator, and outputs data transferred on the selected bus to outside the system integrated circuit so that an observer can observe internal state of the system integrated circuit from outside.

14 Claims, 19 Drawing Sheets

FIG. 7A

| EXTERNAL SELECTION CONTROL SIGNAL | INTERNAL SELECTION CONTROL SIGNAL | OBSERVATION BUS |
|---|---|---|
| 00 | BASED ON MATCH DETECTION BY COMPARATOR | |
| 01 | SEL1 | DATA BUS |
| 10 | SEL2 | I/O BUS |
| 11 | SEL3 | STREAM BUS |

FIG. 7B

IN THE CASE OF SIMPLE FIXATION

| | INTERNAL SELECTION CONTROL SIGNAL | OBSERVATION BUS |
|---|---|---|
| COMPARATOR 11 DETECTS MATCH | — — | — — |
| COMPARATOR 12 DETECTS MATCH | — — | — — |
| COMPARATOR 13 DETECTS MATCH | — — | — — |
| COMPARATOR 14 DETECTS MATCH | SEL1 | DATA BUS |
| COMPARATOR 15 DETECTS MATCH | SEL2 | I/O BUS |

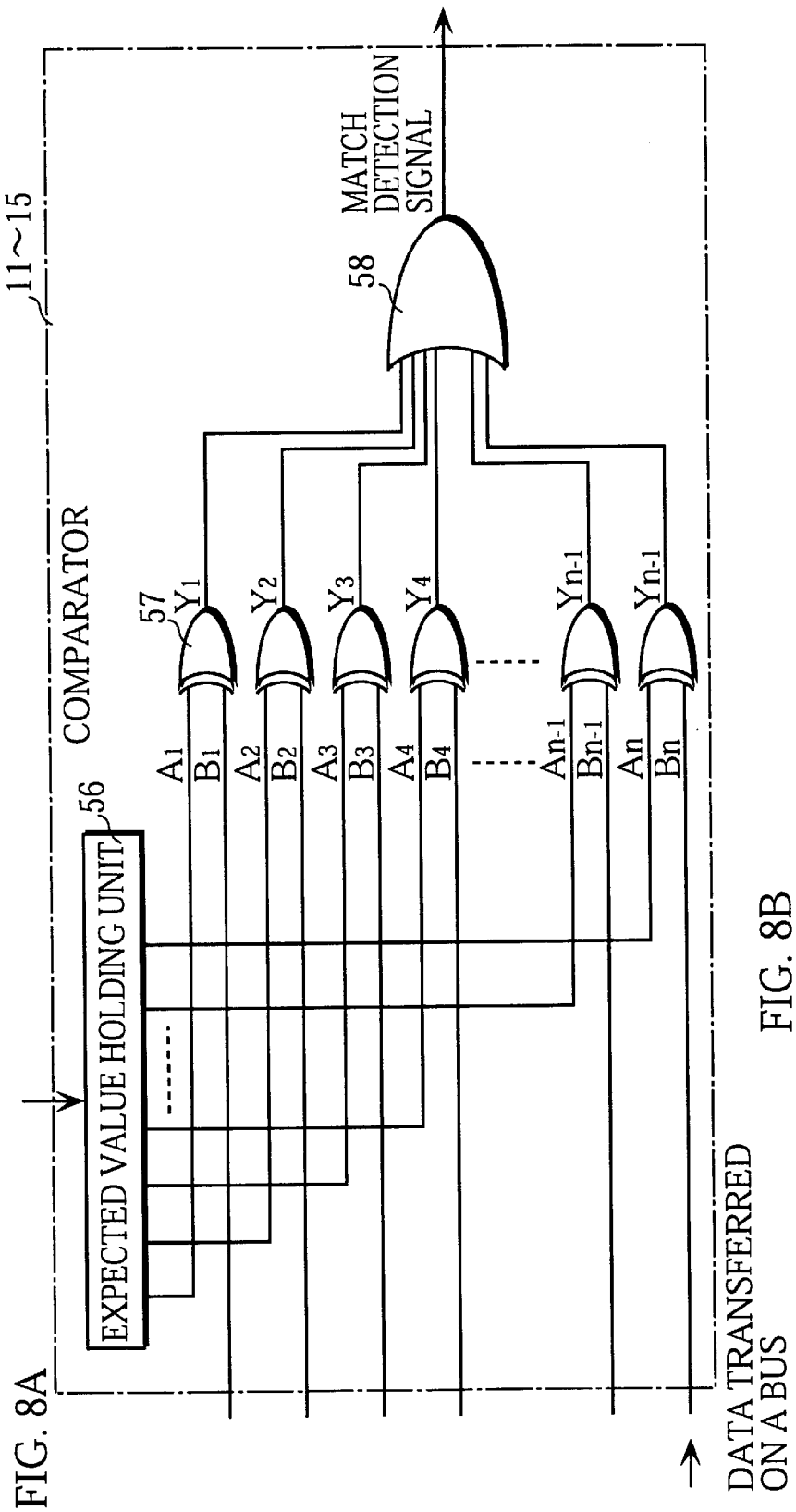

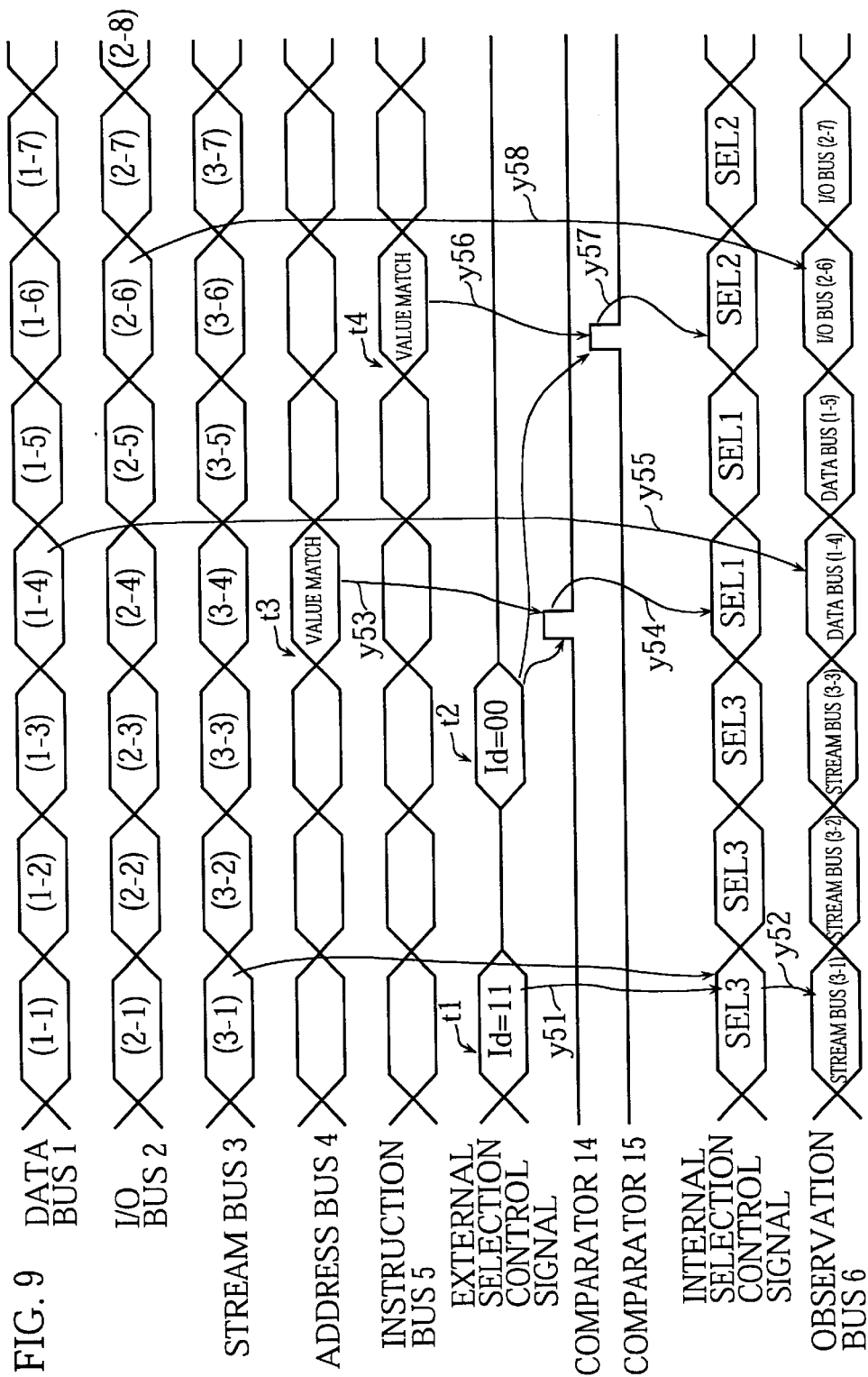

IN THE CASE OF DYNAMIC CHANGE

SYSTEM INTEGRATED CIRCUIT

BACKGROUND OF THE INVENTION (1). Field of the Invention

The present invention relates to a system integrated circuit having a data processing system which includes buses and devices. More particularly, the present invention relates to an improvement concerning observation of the internal state of the system integrated circuit.

(2). Description of Related Art

Due to the improvement in the semiconductor processing technique, system LSIs containing a whole data processing system are appearing on the semiconductor market. Typically, a data processing system includes a plurality of devices such as a CPU and a memory, and also includes buses connecting the devices. Conventional data processing systems prior to the appearance of system LSIs are manufactured by housing a plurality of parts (devices) on a board then wiring the board by connecting the parts via buses (such a data processing system is called a board-type system). In contrast, the data processing system in a system LSI is achieved by housing the plurality of devices and buses in an LSI package with high density. Naturally, an electronic equipment containing such a system LSI can be small and light. The data processing system contained in a package is resistant to noises from outside the product containing the package, and therefore provides a stable operation.

Meanwhile, in the board-type system, probes are connected from a logic analyzer to desired points on wires on the board to observe transfers of data or addresses on buses of the data processing system. This, however, is not possible in system LSIs since every bus or connection line is in the system LSIs, namely concealed in the system LSIs. This may cause a problem that when a malfunction occurs in the system, the cause of the malfunction cannot be identified. This will cause the system debugging process to spend a lengthy amount of time.

Designers of system LSIs may try to solve this problem by assigning dedicated output terminals to necessary internal buses. It is typical, however, that the total number of output terminals of system LSIs is strictly restricted to reduce the product size and cost. As a result, assigning output terminals to all of a plurality of 24-bit and 32-bit buses in a system LSI is unrealistic, though possible (for example, when there are three 24-bit buses in a system integrated circuit, 72 output terminals should be assigned to them in total for observation). The output terminals can be assigned to only a limited number of internal buses. This narrows the range of observation in terms of the contents transferred on the buses. In this case, when a malfunction occurs in the system LSI, the cause of the malfunction cannot be thoroughly investigated.

It is expected that as a larger scale of data processing system is housed in the system LSI, the structure of the system LSI becomes complicated and the number of malfunctions occurring in the system LSI increases drastically. This will increase the amount of time spent by the system debugging process since the above-mentioned strict restrictions on the total number of output terminals will remain the same.

SUMMARY OF THE INVENTION

It is therefore an object of the present invention to provide a system integrated circuit that identifies the cause of a malfunction even if the number of output terminals of a system LSI to be assigned to the internal buses in the system LSI is strictly restricted.

The above object is fulfilled by a system integrated circuit containing a plurality of buses, comprising: a comparator operable to compare data transferred on one of the plurality of buses with a predetermined expected value; a selector unit operable to output data transferred on one of the plurality of buses to outside the system integrated circuit in accordance with a result of the comparison performed by the comparator.

With the above construction, since the selector unit can change a bus transferring data which is to be output to outside the system integrated circuit, based on whether the comparator judges as "match", even if the system integrated circuit does not have enough output terminals to be assigned to all of the plurality of buses, observers can recognize, from outside the system integrated circuit, data transferred on various buses in the system integrated circuit.

Since a bus transferring data which is to be output to outside the system integrated circuit is changed based on whether the comparator judges as "match", when a certain address is suspected of holding some data to cause a malfunction, for example, it is possible for an observer to check from outside the system integrated circuit what kind of data is transferred on a data bus while a location indicated by the suspicious address is 1accessed, by setting the suspicious address in the comparator connected to the address bus and allowing the data transferred on the data bus to be output to the observation bus when the comparator judges as "match". This enables the observer to observe what kind of data is read or written in the system integrated circuit while there is a high possibility that the malfunction occurs. This enables the observer to detect a cause of the malfunction efficiently.

Furthermore, there may be a case where the cause of a malfunction cannot be detected just by observing data or addresses transferred on buses due to an enormous scale of the data processing system. In such a case, however, the system integrated circuit achieves a high-level observation method of changing observation target buses automatically based on various conditions since in the system integrated circuit, a bus transferring data which should be output to outside the system integrated circuit is changed to another bus each time the comparator judges that an expectation matches data transferred on a bus.

In the above system integrated circuit, each of the plurality of comparators may include a holding unit operable to hold an expected value, and the system integrated circuit further comprises an update unit operable to update an expected value held by each holding unit.

With the above construction, the observer can set the expected value as he/she likes. This makes the detection of the cause of malfunction more efficient.

The above system integrated circuit may further comprise: an output unit operable to output, when the selector unit outputs data transferred on a bus corresponding to the comparator to outside the system integrated circuit, an identification number of the bus to outside the system integrated circuit.

With the above construction, the observer can identify the bus transferring the data that is output to outside the system integrated circuit, where the bus is selected based on whether a comparator detects a match.

In the above system integrated circuit, the plurality of buses may include an external-device-dedicated bus which is used to transfer either a predetermined kind of data or a predetermined address to be output to an external device connected to to the system integrated circuit, and the selector unit continues to output either the predetermined kind of data or the predetermined address to outside the system integrated circuit when the comparator judges that the predetermined expected value does not match the data, and the selector unit outputs data transferred on another bus to outside the system integrated circuit when the comparator judges that the predetermined expected value matches the data transferred on the bus to which the comparator is connected.

With the above construction, an output terminal of the system integrated circuit used for outputting data to an external device can also be used by the selector unit to output data transferred on a bus to outside the system integrated circuit. This improves the cost performance of the system integrated circuit.

The above system integrated circuit may further comprise: a receiving unit operable to receive data from outside the system integrated circuit; and a judgement unit operable to judge whether the data received by the receiving unit either is a default value or includes a designation of a bus transferring data which should be output, and the selector unit outputs data transferred on another bus to outside the system integrated circuit when the data received by the receiving unit is the default value, and when the data received by the receiving unit includes the designation of a bus, the selector unit outputs data transferred on the bus designated by the data received by the receiving unit.

With the above construction, a bus transferring data which should be output to outside the system integrated circuit is changed to another bus in accordance with the comparison results of the comparator, and at the same time the bus can be specified explicitly from outside the system integrated circuit. This provides more options to the observer in observing inside the system integrated circuit.

The above system integrated circuit comprising a plurality of comparators, wherein each bus may be connected to two or more comparators, one of the two or more comparators connected to a same bus judges whether a predetermined expected value matches data transferred on the same bus, another of the two or more comparators connected to the same bus judges whether another predetermined expected value matches the data transferred on the same bus, and the selector unit outputs data transferred on one of the plurality of buses to outside the system integrated circuit when one or both of the two or more comparators judges that a predetermined expected value matches the data transferred on the same bus.

With the above construction, since two comparators are connected to each bus, data transferred on the data bus is selectively output to outside the system integrated circuit only when the predetermined, first and second addresses appear on the address bus.

Furthermore, the above selective change is possible even when the expected value cannot be rewritten in time due to a very short period between the transfers of the first address and second address.

In the above system integrated circuit, each of the plurality of buses may be m bits wide, the system integrated circuit comprising k output terminals (k<m), and the selector unit outputs k bits out of m bits to the k output terminals, and then rest of the m bits to the k output terminals.

With the above construction, since data transferred on a bus is output to outside the system integrated circuit in time-sharing, even if the number of output terminals is less than the bit width of the bus to be observed, all the data transferred on the bus can be observed.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 7A shows rules by which the external selection control holding unit 51 outputs the internal selection control signals;

FIG. 7B shows a table showing relationships between identification numbers of the comparators 11 to 15 and internal selection control signals;

FIG. 8A shows a circuit construction of the comparators 11 to 15 which compare a piece of n-bit data transferred on an internal bus with an n-bit expected value;

FIG. 8B is a truth table concerning the exclusive-OR gates 57;

FIG. 9 is a timing chart showing an operation of the system LSI 105 in the internal observation mode;

DESCRIPTION OF THE PREFERRED EMBODIMENTS

Figure 1:
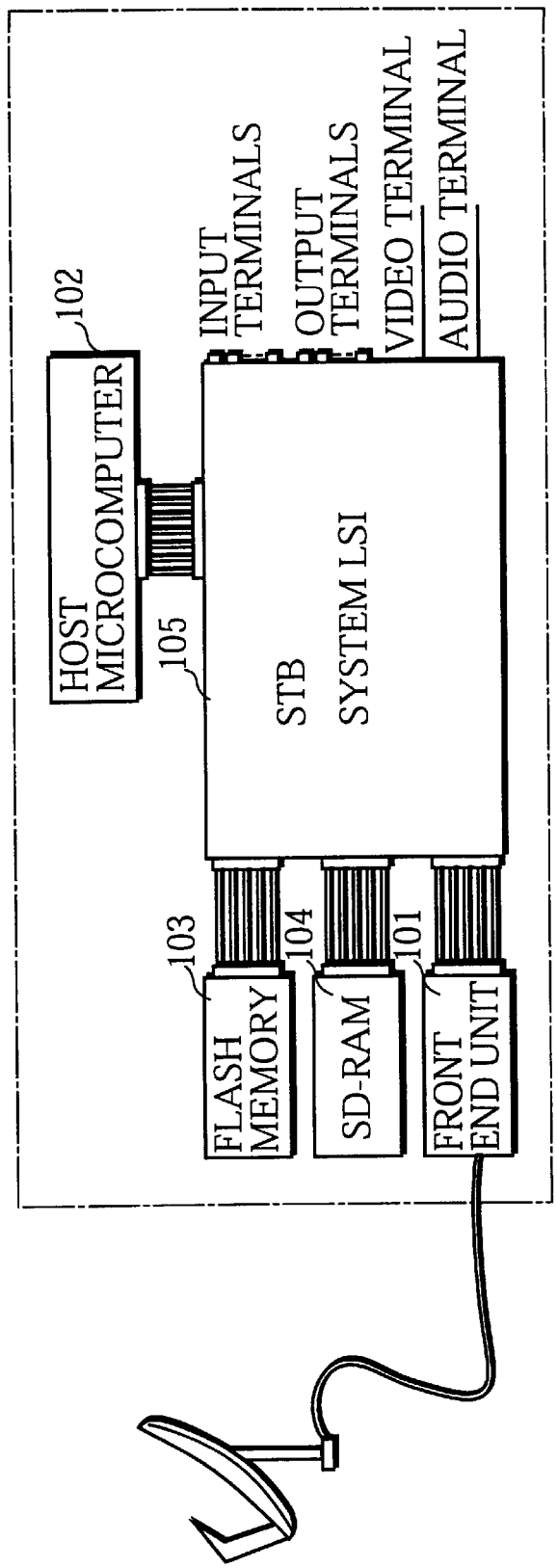
FIG. 1 shows the internal construction of the set-top box containing the system LSI.

The following are description of the present invention through specific embodiments thereof by way of referring to the drawings.

Embodiment 1

The system integrated circuit (system LSI) in Embodiment 1 is contained in a set-top box. FIG. 1 shows the internal construction of the set-top box. The set-top box is an apparatus which receives a broadcast wave via satellite broadcasting, ground waves, or cables, separates transport streams from the received broadcast wave, decodes the transport streams, and outputs video signals, audio signals or the like. A set-top box is used at home, combined with a TV receiver or a personal computer.

As shown in FIG. 1, the set-top box includes a front end unit 101, a host microcomputer 102, a flash memory 103, a SD-RAM 104, and a system LSI 105.

The front end unit 101 demodulates the broadcast wave received by a satellite broadcast antenna 100 and outputs transport streams conforming to the MPEG2 standard one by one.

The host microcomputer 102 controls the main part of the set-top box.

The flash memory 103 stores a plurality of instructions in advance.

The SD-RAM 104 stores a plurality of pieces of data in advance. Substantially all of the basic processes to be performed by the set-top box are achieved in the system LSI 105. As a result, the wiring inside the set-top box is very simple.

Figure 2:
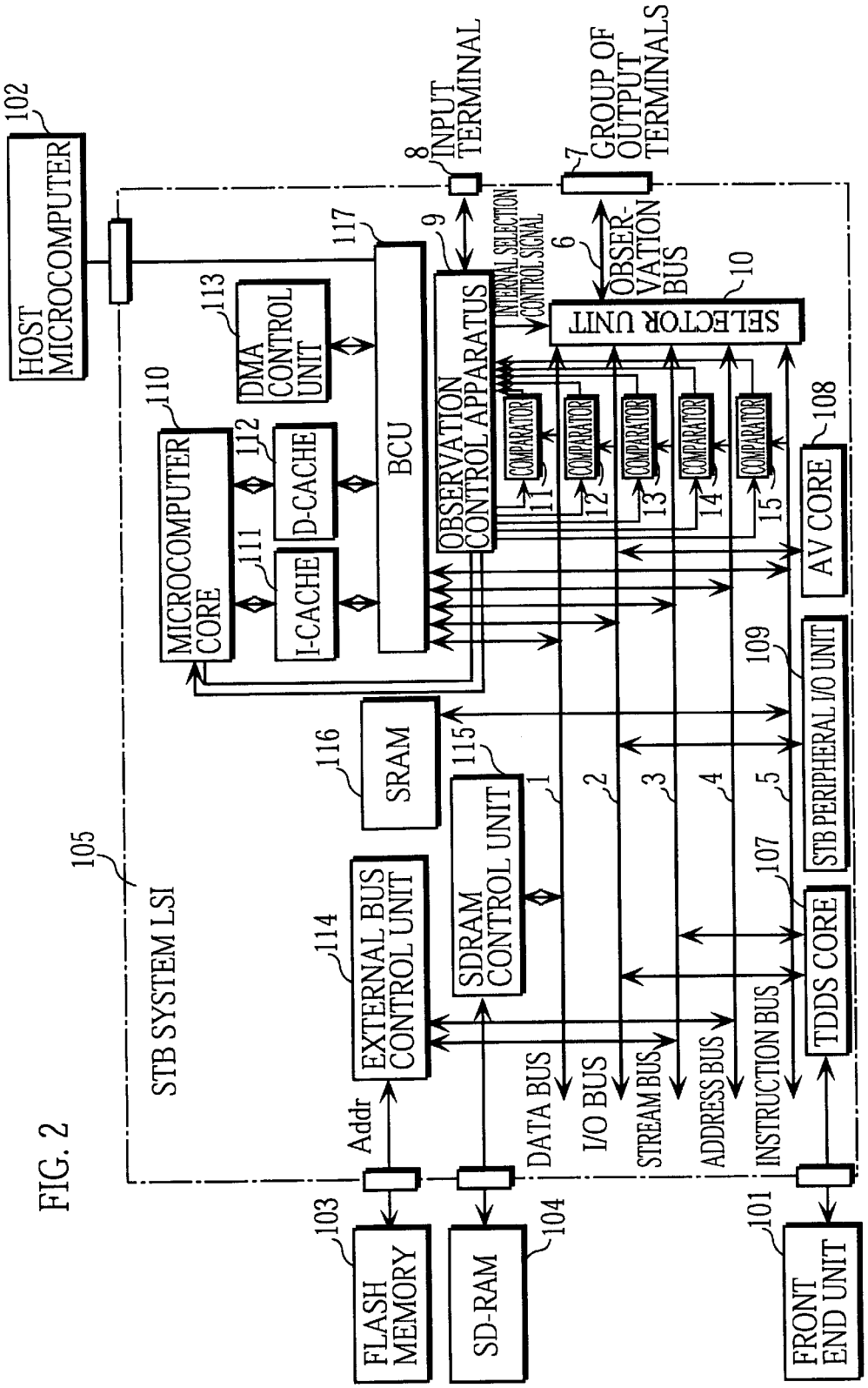
FIG. 2 shows the internal construction of the system LSI.

Though the wiring may be simpler than conventional techniques, various components are contained in the system LSI 105 with high density. The components of the system LSI 105 will be, described with reference to FIG. 2. As shown in FIG. 2, the system LSI 105 includes: a transport decode descramble (TDDS) core 107 which, when a transport stream output from the front end unit 101 has been scrambled, descrambles the transport stream and also separates the transport stream into video streams conforming to the MPEG2 standard, audio streams or the like; an AV core 108 for decoding the video streams and audio streams to obtain video signals and audio signals; an STB peripheral I/O unit 109 which is composed of a serial interface, a timer and the like; a microcomputer core 110 for controlling the system LSI 105; an I-Cache 111 that is a cache memory for storing instructions; a D-Cache 112 that is a cache memory for storing data; a DMA control unit 113 for controlling DMA transfers on I/O buses and stream buses; an external bus control unit 114 for reading instructions from the flash memory 103; an SDRAM control unit 115 for reading and writing from/to the SD-RAM 104; an SRAM 116 for storing instructions that need to be accessed at high speed, the instructions being selected from those stored in the flash memory 103; a BCU 117; five buses (a data bus 1, an I/O bus 2, a stream bus 3, an address bus 4, and an instruction bus 5), an observation bus 6, a group of output terminals 7, an input terminal 8, an observation control apparatus 9, a selector unit 10, and comparators 11 to 15. It may be said that board-like processes conforming to the MPEG2 standard are condensed in the system LSI 105. Among these components, the TDDS core 107 to the STB peripheral I/O unit 109 are not described in detail since they are not much related to Embodiment 1.

Most of the above components of the system LSI 105 are connected to any of the five buses. The components are classified into master devices (devices which request a service) and slave devices (devices which provide a service).

Figure 3:
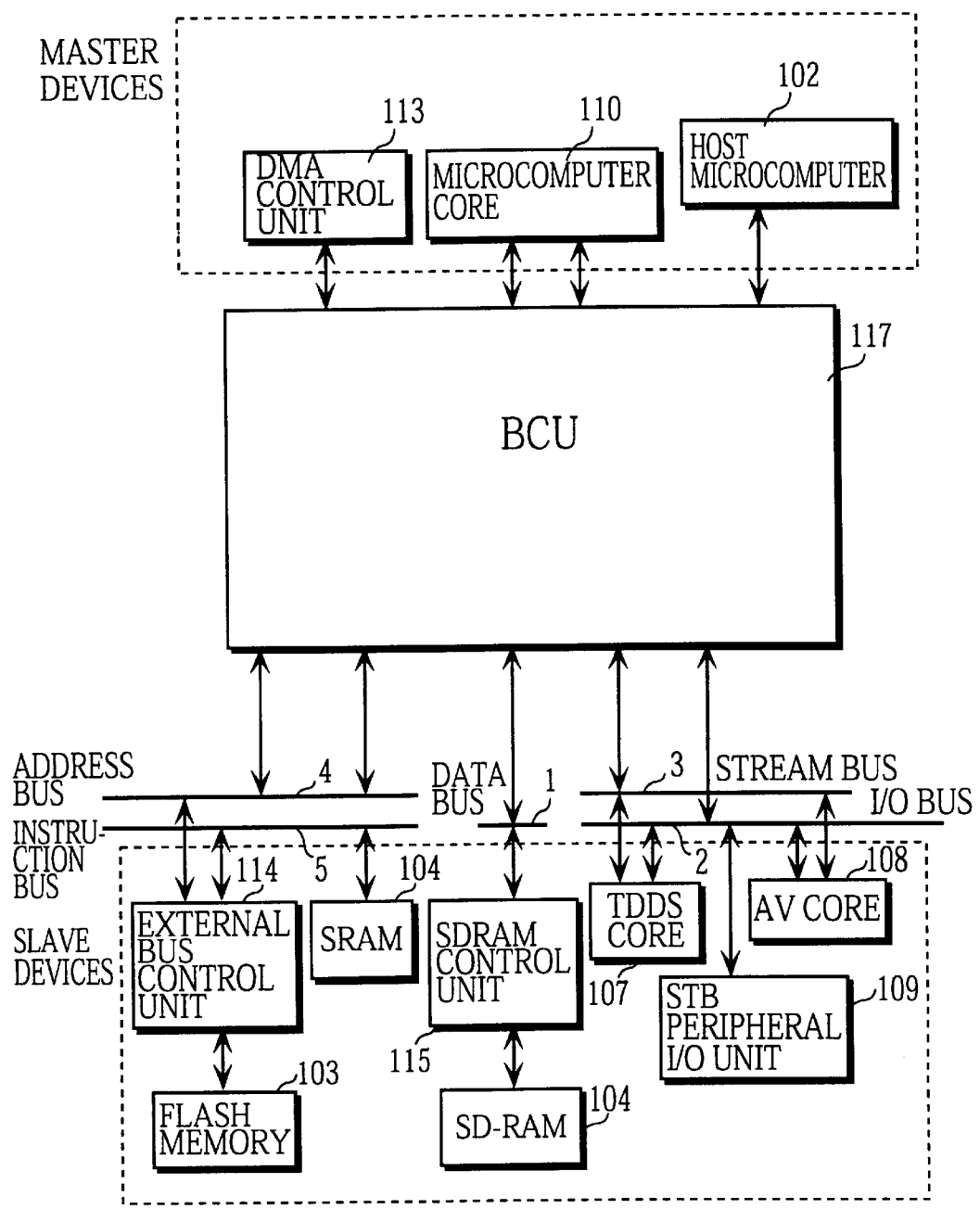
FIG. 3 shows the classification of the components shown in FIG. 2 into master devices and slave devices.

FIG. 3 shows the classification of the components of the system LSI 105. As shown in FIG. 3, the microcomputer core 110, DMA control unit 113, and host microcomputer 102 belong to master devices, and the flash memory 103, SD-RAM 104, TDDS core 107, AV core 108, STB peripheral I/O unit 109, and microcomputer core 110 which are connected to the five internal buses belong to slave devices (note that in this classification, the observation control apparatus 9, selector unit 10, and comparators 11 to 15 belong to neither master devices nor slave devices). When there are a plurality of master devices as in the system LSI 105, an arbiter is required for solving a possible contention in which two or more master devices request to access a slave device (to use an internal bus) at the same time. In the system LSI 105, the BCU 117 functions as an arbiter.

Figure 4:
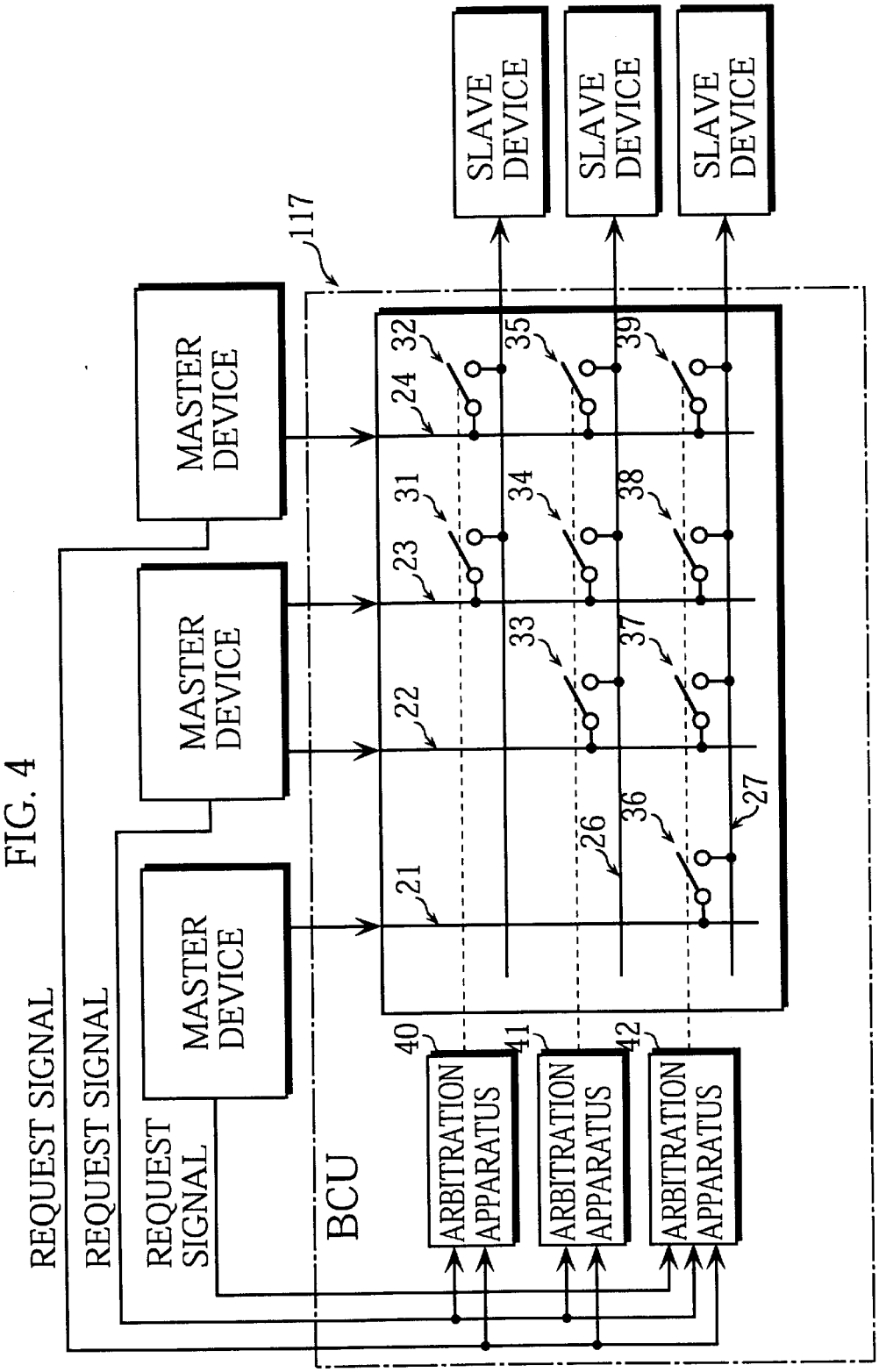
FIG. 4 shows the internal construction of the BCU 117.

FIG. 4 shows the internal construction of the BCU 117. As shown in FIG. 4, the BCU 117 includes buses 21 to 27 which are arranged like crossing rows and columns and are connected to the master devices and slave devices, cross-bus switches 31 to 39 each of which connects or disconnects two crossing buses, and arbitration apparatuses 40 to 42 which turn on or off the cross-bus switches in accordance with request signals output from the master devices.

The BCU 117 connects any combinations of the three master devices and six slave devices (five internal buses) by turning on or off the cross-bus switches 31 to 39. Also, since a plurality of combinations of the master devices and slave devices can be connected simultaneously, it is possible for the system LSI 105 to transfer data between a plurality of master devices and a plurality of slave devices simultaneously. When a contention occurs between two or more master devices for a slave device, a master device executing a task with the highest priority level is allowed to use the slave device first.

Figure 5:
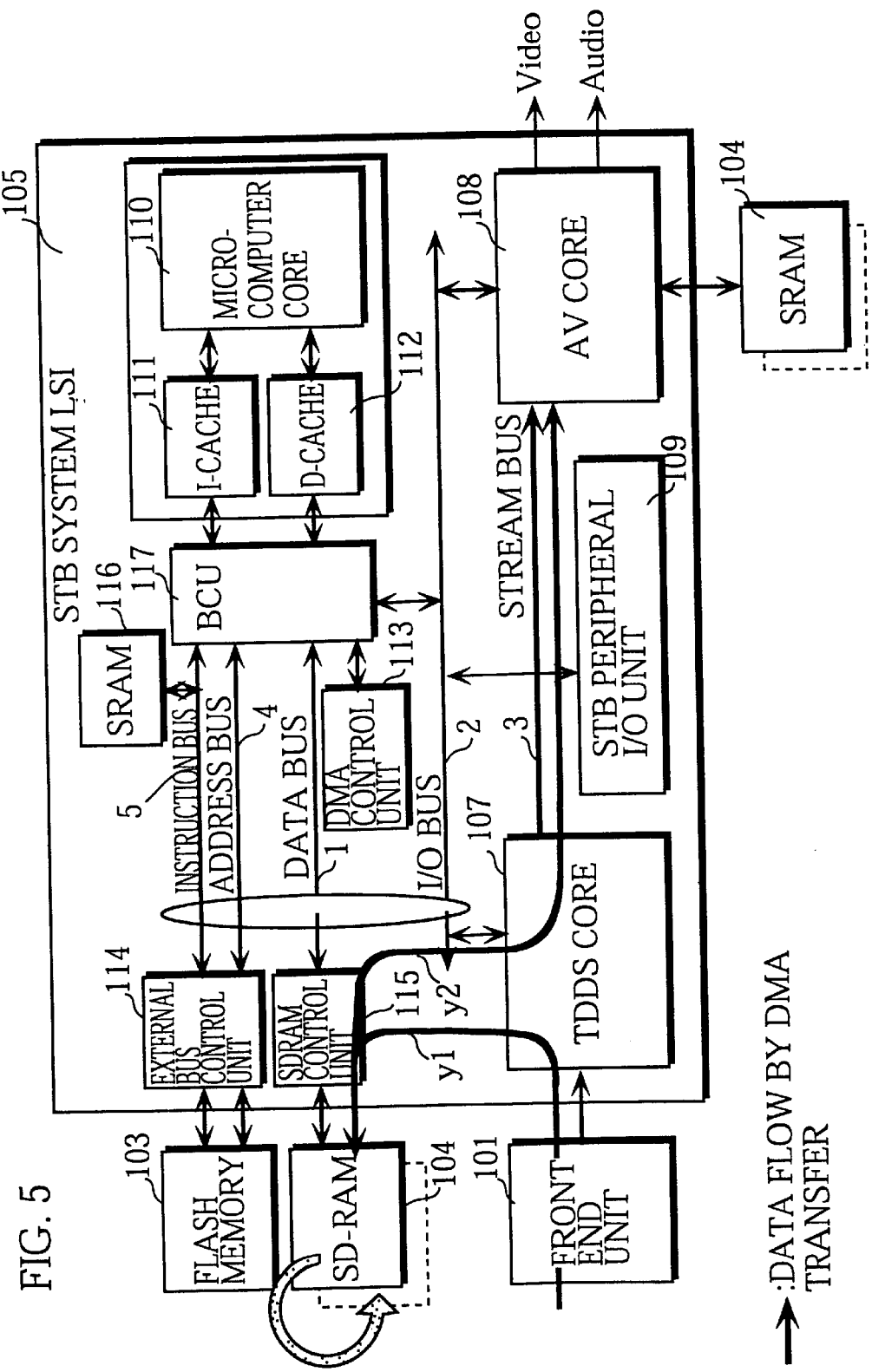
FIG. 5 shows simultaneous data transfers achieved by a plurality of combinations of the master devices and slave devices connected simultaneously by the BCU 117.

FIG. 5 shows a plurality of combinations of the master devices and slave devices connected simultaneously by the BCU 117, and simultaneous data transfers between a plurality of master devices and a plurality of slave devices in the system LSI 105. The TDDS core 107, after descrambling and separating a transport stream received from the front end unit 101, first stores the transport stream into the SD-RAM 104 as arrow y1 indicates, then transfers the transport steam from the SD-RAM 104 to the AV core 108 via the stream bus 3 as arrow y2 indicates. The DMA control unit 113 controls such a DMA transfer in which the transport stream is transferred as "front end unit 101 - - - SD-RAM 104 - - - AV core 108".

The SD-RAM 104 stores data which is read or written by the microcomputer core 110, as well as transport streams. In this case, there is a possibility that a contention occurs between the TDDS core 107 and the microcomputer core 110 for an access (reading or writing) to the SD-RAM 104. The BCU 117 operates as an arbiter to solve such contentions. The simultaneous data transfers between a plurality of master devices and a plurality of slave devices in the system LSI 105 owes much to the presence of the BCU 117. However, the more frequently simultaneous data transfers are performed, which causes various related processes to be executed in the system LSI 105, the more frequently malfunctions occur. The system LSI 105 should therefore be designed so that the internal state of the system LSI 105 can be known to outside thereof in some way. For this purpose, the present embodiment provides the internal observation mode in which the system LSI 105 outputs information of contents of transfers on the five buses to outside so that an observer can observe the internal state of the system LSI 105. The internal observation mode is achieved by the observation control apparatus 9, selector unit 10, and comparators 11 to 15 which belong to neither master devices nor slave devices, and by the observation bus 6, among the components shown in FIG. 5.

Figure 6:
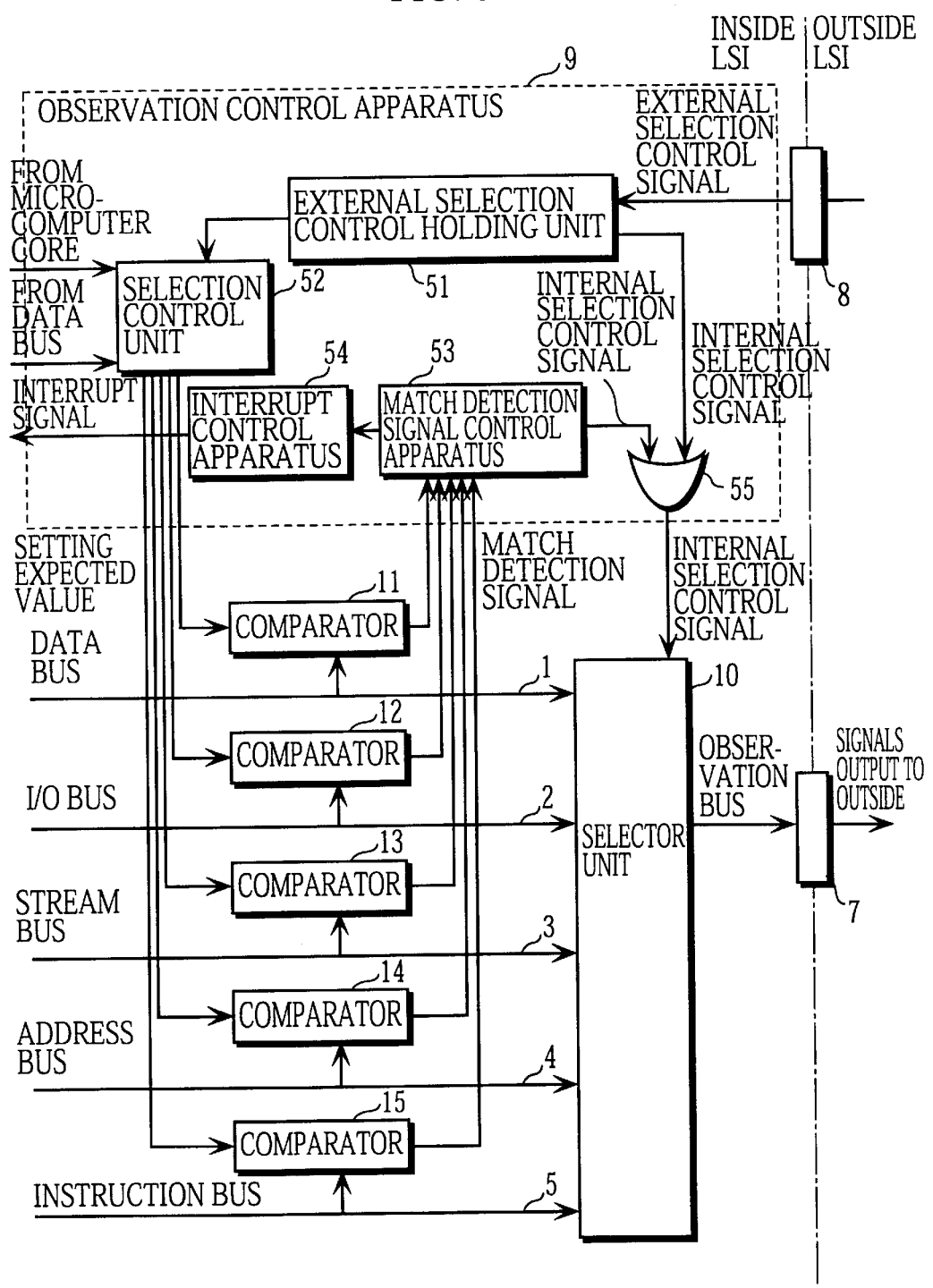
FIG. 6 shows the components of the system LSI 105 which are used for achieving the internal observation mode.

FIG. 6 shows the components of the system LSI 105 which are used for achieving the internal observation mode. These components will be described with reference to FIG. 6.

The observation control apparatus 9 includes an external selection control holding unit 51, a selection control unit 52, a match detection signal control apparatus 53, an interrupt control apparatus 54, and an OR circuit 55, and controls the system LSI 105 in the internal observation mode (components of the devices 10 to 15 will be explained after the components 51 to 55 of the observation control apparatus 9).

The external selection control holding unit 51 holds an external selection control signal received from outside the system LSI 105. When the external selection control signal contains an identification number of a bus to which data should be output, the external selection control holding unit 51 outputs, to the selector unit 10, an internal selection control signal that indicates the bus identified by the identification number.

The present embodiment assigns identification numbers "1" to "5" to the data bus 1 to instruction bus 5, respectively. The identification numbers correspond to internal selection control signals SEL1 to SEL5, respectively. The external selection control holding unit 51 outputs the internal selection control signals to the selector unit 10 via the OR circuit 65. FIG. 7A shows rules by which the external selection control holding unit 51 outputs the internal selection control signals. According to FIG. 7A, internal selection control signal SEL1, SEL2, or SEL3 is output when the identification number contained in the external selection control signal is "01", "10", or "11", respectively. When the identification number contained in the external selection control signal is "00", which is a default value, the match detection signal control apparatus 53 selects an internal selection control signal to be output.

The selection control unit 52 sets an expected value in each comparator in accordance with instructions from the microcomputer core 110.

The match detection signal control apparatus 53 contains a table showing relationships between identification numbers of the comparators 11 to 15, which are respectively connected to internal buses 1 to 5, and identification numbers of internal buses to which data should be output when the comparators detects a "match". Each of the comparators 11 to 15 compares data to be transferred on any of the five internal buses with a certain expected value. When a comparator judges that the values match, the match detection signal control apparatus 53 detects the identification number of the comparator, refers to the table to read a bus identification number corresponding to the detected identification number of the comparator, and outputs the read bus identification number to the selector unit 10 via the OR circuit 55. As will be understood from the table, a match of data transferred on a bus with a certain expected value detected by a comparator corresponds to another bus which transfers a different kind of data.

FIG. 7B shows a table showing relationships between identification numbers of the comparators 11 to 15 and internal selection control signals. In this table, as described above, a match of data transferred on a bus with a certain expected value detected by a comparator connected to the bus corresponds to another bus which transfers a different kind of data.

As shown in FIG. 7B, when the comparator 14 judges that data to be transferred on internal bus 4 matches the expected value, internal selection control signal SEL1 is output. Also, when the comparator 15 judges that data to be transferred on internal bus 5 matches the expected value, internal selection control signal SEL2 is output. The contents of the table are rewritten by the microcomputer core 110.

The interrupt control apparatus 54 outputs an interrupt signal to the microcomputer core 110 after receiving a notification from the match detection signal control apparatus 53 that any comparator has detected a "match". Receiving of the interrupt signal enables the microcomputer core 110 to detect an occurrence of a certain signal state by software and execute a certain process corresponding to the certain signal state. A typical certain process is a debug program in the supervisor area. The microcomputer core 110 changes the assignment of the internal selection control signals to be output corresponding to the "match" detection based on the expected values by rewriting an expected value set in each of the comparators 11 to 15 and the table held by the match detection signal control apparatus 53.

The OR circuit 55 selectively outputs one of two internal selection control signals output from the external selection control holding unit 51 and the match detection signal control apparatus 53 to the selector 10. Now that all the components of the observation control apparatus 9 have been explained, the components of the selector unit 10 and other devices will be described.

The selector unit 10 includes five input terminals respectively connected to the data bus 1, I/O bus 2, stream bus 3, address bus 4, and instruction bus 5 and an output terminal connected to observation bus 6. The selector unit 10 receives an internal selection control signal output from the external selection control holding unit 51 or the match detection signal control apparatus 53 via the OR circuit 65, and in accordance with the received internal selection control signal, outputs the data transferred on a bus corresponding to the received internal selection control signal to the observation bus 6. Here, since the observation bus 6 is connected to the group of output terminals 7, an observer can observe the data transferred on the internal bus from outside the system LSI 105 by connecting a probe of a logic analyzer to the group of output terminals 7 and checking the data output from the selector unit 10 to the observation bus 6.

The comparators 11 to 15 are respectively connected to internal buses 1 to 5, and compare data to be transferred on the internal buses with the expected values set by the selection control device 52 to judge whether they match.

FIG. 8A shows a circuit construction of the comparators 11 to 15 which compare a piece of n-bit data transferred on an internal bus with an n-bit expected value. As shown in FIG. 8A, each comparator includes an expected value holding unit 56, n exclusive-OR gates 57, and a logical OR gate 58. Note that in FIG. 8A, the piece of n-bit data is composed of n bits A1, A2, A3, . . . , An, and the n-bit expected value is composed of n bits B1, B2, B3, . . . , Bn.

The expected value holding unit 56 holds the n-bit expected value. The expected value is rewritten by the selection control device 52 under the control of the microcomputer core 110.

Each of the n exclusive-OR gates 57 ORs the $i^{th}$ bit Ai in the piece of n-bit data with the $i^{th}$ bit Bi in the n-bit expected value, and outputs the $i^{th}$ bit Yi in an n-bit output value, where i=1, 2, 3, . . . , n. FIG. 8B is a truth table concerning the n exclusive-OR gates 57. As shown in FIG. 8B, when two input terminals of each exclusive-OR gate 57 receives two "0"s or two "1"s as Ai and Bi, the exclusive-OR gate 57 outputs "0" as Yi from the output terminal, indicating a "match". When the two input terminals receives different bit values as Ai and Bi, the exclusive-OR gate 57 outputs "1" as Yi from the output terminal, indicating a "mismatch".

The logical OR gate 58 is a gate circuit which performs a disjunction operation of the n bits "Yi" output from the n exclusive-OR gates 57. When any of the n bits "Yi" is "1", the logical OR gate 58 outputs "1" as the match detection signal, indicating that the piece of n-bit data does not match the n-bit expected value; when all the n bits "Yi" are "0", the logical OR gate 58 outputs "0" as the match detection signal, indicating that the piece of n-bit data matches the n-bit expected value.

It should be noted here that although in the present embodiment, each and every bit of the n-bit expected value is checked if it match a corresponding bit of data. Instead of this, a part of the expected value may be masked, and the OR operation may be performed for the not-masked part of the expectation data. Furthermore, it may be judged whether the data transferred on a bus is higher or lower than a certain expected value.

Up to this point, the components for the internal observation mode have been explained. Now, the operation of the system LSI 105 in the internal observation mode using the components will be described. FIG. 9 is a timing chart showing an operation of the system LSI 105 in the internal observation mode. FIG. 9 include 10 rows which respectively show from the top the data transferred on the data bus 1, I/O bus 2, stream bus 3, address bus 4, and instruction bus 5, the external selection control signal, match detection signals from the comparators 14 and 15, the internal selection control signal, and the data transferred on the observation bus 6.

At time point t1 in FIG. 9, when the external selection control signal is input from outside the system LSI 105, the external selection control holding unit 51 reads the identification number (Id=11) from the input signal and outputs internal selection control signal SEL3, as indicated by arrow y51, so that the data transferred on an internal bus (any of 1 to 5) identified by the identification number (Id=11) is output to the observation bus 6. After the internal selection control signal SEL3 is sent to the selector unit 10, the selector unit 10 outputs the data (3-1, 3-2, and 3-3) transferred on the stream bus 3 to the observation bus 6, as indicated by arrow y52.

FIG. 9 shows that at time point t2, another external selection control signal containing identification number (Id=00) is received by the external selection control holding unit 51. As shown in FIG. 7A, when the identification number is "00", a bus transferring data which should be output to outside is determined based on the match detection of a comparator. When this happens, the external selection control holding unit 51 stops outputting internal selection control signal SEL3. Suppose then that at time point t3, the comparator 14 connected to the address bus 4 detects a "match" between data and an expected value. As a result, as indicated by arrow y53, the comparator 14 outputs a match detection signal. By referring to the table shown in FIG. 7B, it is found that the match detection of the comparator 14 corresponds to internal selection control signal SEL1. The match detection signal control apparatus 53, therefore, as indicated by arrow y54, outputs internal selection control signal SEL1. After the internal selection control signal SELL is sent to the selector unit 10, the selector unit 10 outputs the data (1-4, and 1-5) transferred on the data bus 1 to the observation bus 6, as indicated by arrow y55. Here, suppose that the expected value is an address in the flash memory 103 and that an instruction suspected of causing a malfunction is placed in a location specified by the address, then it is possible for an observer to check from outside the system LSI 105 what kind of data is transferred on the data bus 1 when the suspicious instruction is executed.

Suppose that after the internal selection control signal SEL1 is output, at time point t4, the comparator 15 detects a "match". The comparator 15 then outputs a match detection signal, as indicated by arrow y56. By referring to the table shown in FIG. 7B, it is found that the match detection of the comparator 15 corresponds to internal selection control signal SEL2. The match detection signal control apparatus 53, therefore, as indicated by arrow y57, outputs internal selection control signal SEL2. After the internal selection control signal SEL2 is sent to the selector unit 10, the selector unit 10 outputs the data (2-6, and 2-7) transferred on the data bus 2 to the observation bus 6, as indicated by arrow y58. Here, suppose that the expected value is an instruction suspected of causing a malfunction, then it is possible for an observer to check from outside the system LSI 105 what kind of data is transferred on the data bus 2 when the suspicious instruction is executed.

As described above, when a comparator detects a match between data transferred on a bus and a certain expected value, data transferred on another bus is output to outside the system LSI 105. With this construction, an observer can check from outside the system LSI 105 what kinds of data are transferred on a plurality of buses contained in the system LSI 105.

As described above, the system LSI 105 changes its output based on each comparison result of the comparators. For example, when a certain address is suspected of holding some data to cause a malfunction, it is possible for an observer to check from outside the system LSI 105 what kind of data is transferred on the data bus 1 while a location indicated by the suspicious address is accessed, by setting the suspicious address in the comparator connected to the address bus 4 and allowing the data transferred on the data bus 1 to be output to the observation bus when the comparator detects a "match". When this is possible, it is possible to recognize what kind of data is read or written in the system LSI 105 when the malfunction occurs. This enables the observer to track down the cause of a malfunction efficiently.

In the present embodiment, a table is used so that when a comparator detects a match between data transferred on a bus and a certain expected value, data transferred on another bus is output to outside the system LSI 105. However, the system LSI may adopt a simpler structure in which a comparator is connected to one of a plurality of buses, and when the comparator detects a match between data transferred on the connected bus and a certain expected value, the data transferred on the bus is output to outside the system LSI 105.

In the present embodiment, the output to the observation bus is changed based on whether a comparator detects a match between data and an expected value. In stead of this, the output to the observation bus may be changed based on whether data transferred on a bus is higher or lower than an expected value.

Embodiment 2

Embodiment 2 relates to an improvement to Embodiment 1. More specifically, In Embodiment 2, the internal selection control signal to be output is dynamically changed. For this purpose, the observation control apparatus 9 of Embodiment 2 has a structure shown in FIG. 10.

Figure 10:
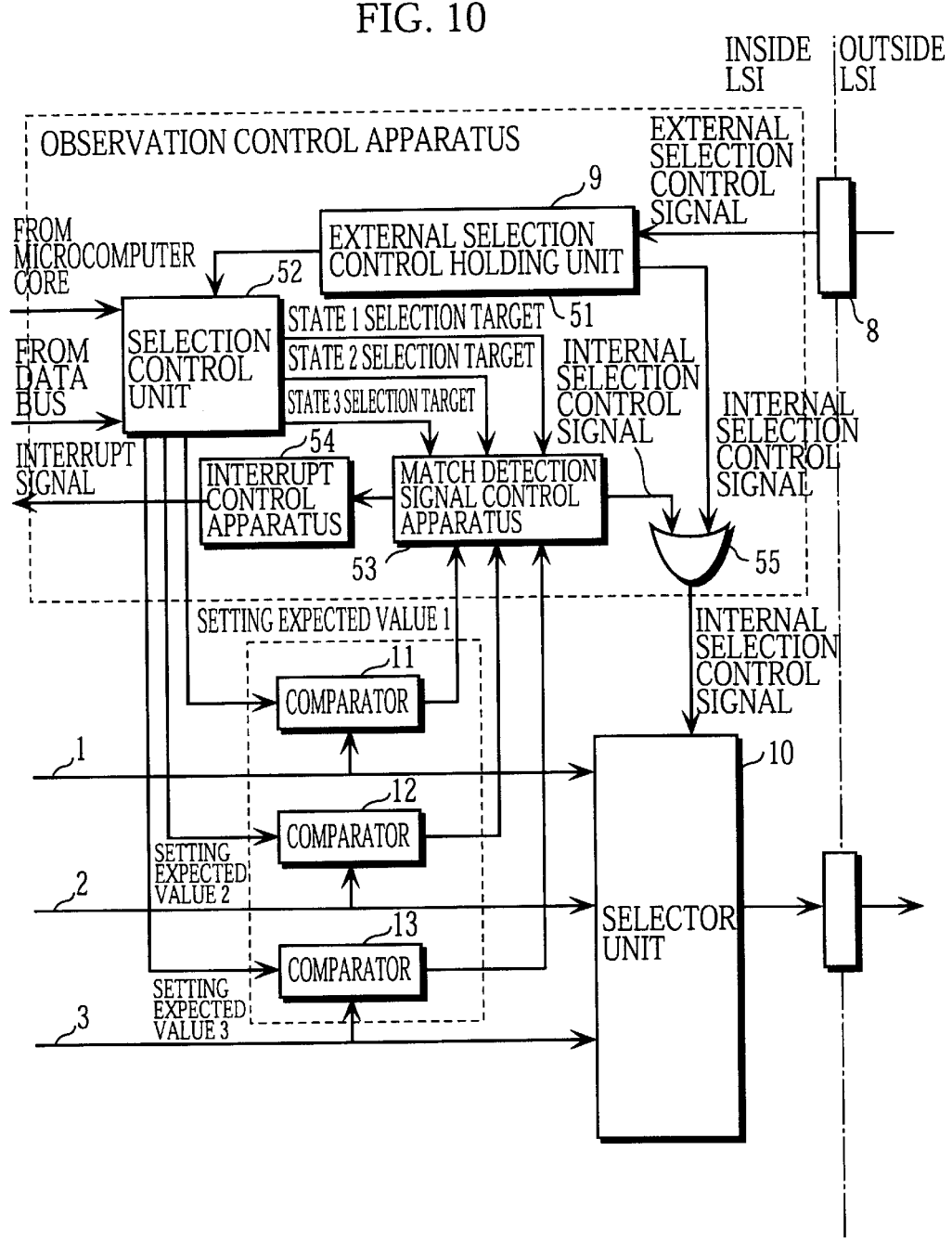
FIG. 10 shows the internal construction of the observation control apparatus 9 in Embodiment 2.

As shown in FIG. 10, the selection control device 52 in Embodiment 2 not only sets an expected value in each comparator in accordance with instructions from the microcomputer core 110 as in Embodiment 1, but also initializes the internal observation state for the match detection signal control apparatus 53.

Figures 11A, 11B:
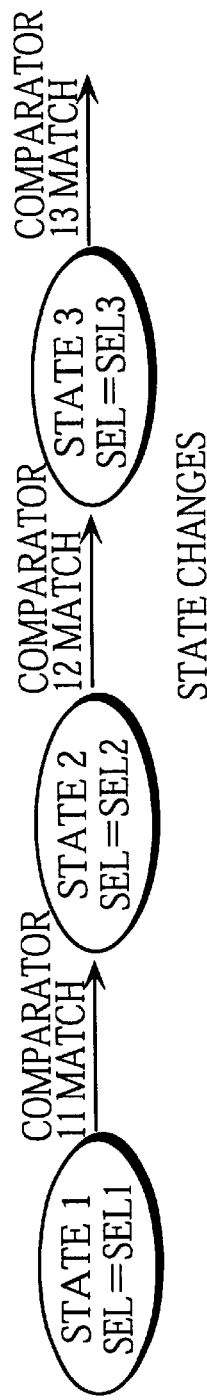
FIGS. 11A and 11B show changes of the internal observation state and its condition.

The internal observation state in Embodiment 2 is defined as follows. The internal observation state in the system LSI 105 in Embodiment 2 is classified into states 1, 2, 3, . . . as shown in FIGS. 11A and 11B. FIGS. 11A and 11B show changes of the internal observation state and its condition. In FIGS. 11A and 11B, the state 1 indicates that the match detection signal control apparatus 53 is currently outputting internal selection control signal SEL1. Similarly, the states 2 and 3 indicate that internal selection control signals SEL1 and SEL2 are currently output, respectively. It should be noted here that although five comparators are connected to the internal buses as described in Embodiment 1, only three comparators among them are used in Embodiment 2, for convenience's sake.

The match detection signal control apparatus 53 shown in FIG. 10 changes the internal observation state in accordance with the match detection by the comparators 11 to 13, and outputs an internal selection control signal corresponding to the internal observation state to the OR circuit 55. The internal observation state changes from "state 1" to "state 2" when the comparator 11 has detected a "match". Similarly, it changes from "state 2" to "state 3" when the comparator 12 has detected a "match", and changes from "state 3" to "state 4" when the comparator 13 has detected a "match".

Figure 12:
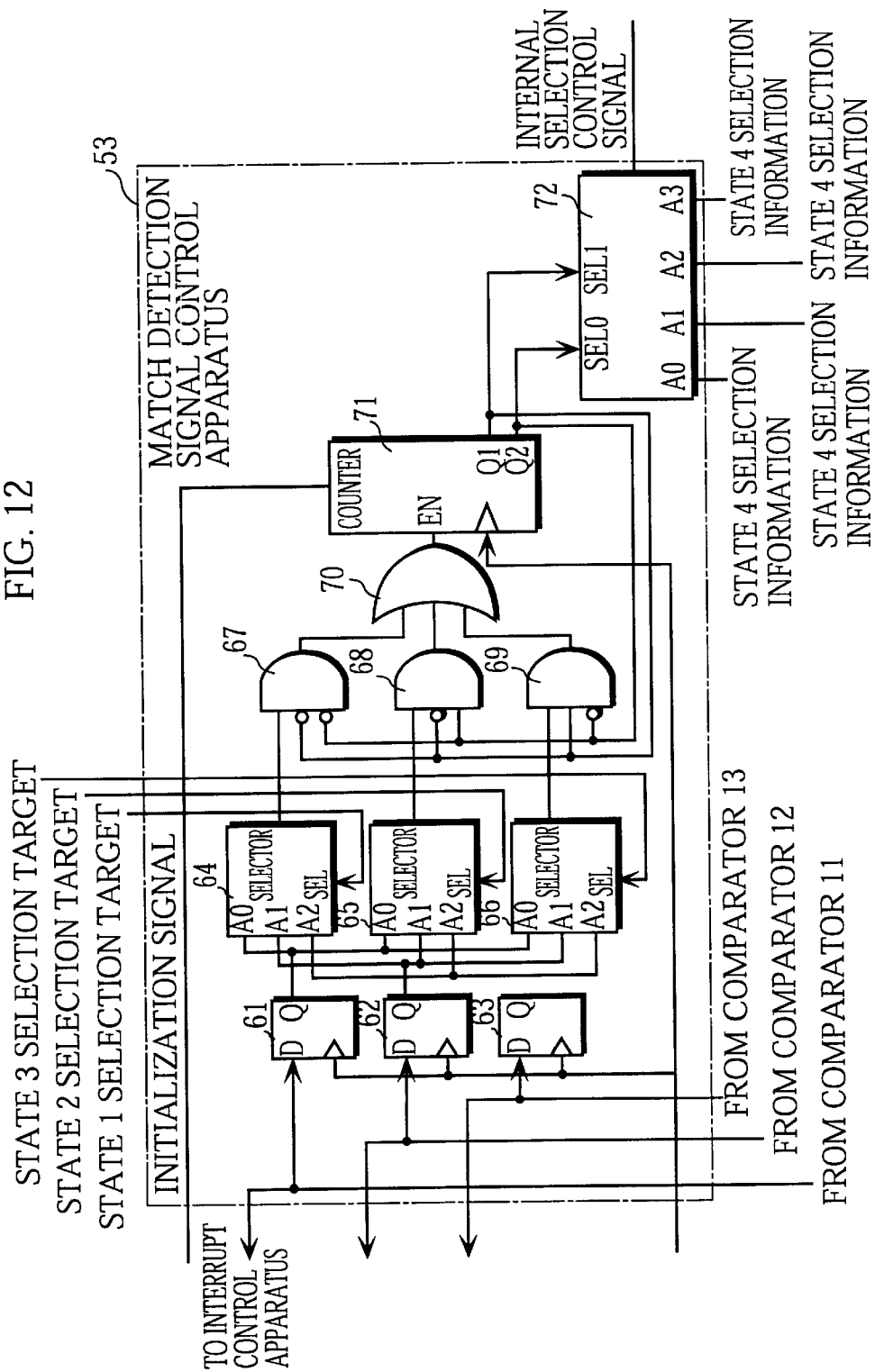
FIG. 12 shows the internal construction of the match detection signal control apparatus 53 in Embodiment 2.

The match detection signal control apparatus 53 of Embodiment 2 has the structure shown in FIG. 12 for achieving the above state change. As shown in FIG. 12, the match detection signal control apparatus 53 includes D-type latches 61 to 63, selectors 64 to 66, AND circuits 67 to 69, an OR circuit 70, a counter circuit 71, and an internal selection control signal output unit 72.

The D-type latches 61 to 63 latch match detection signals sent from the comparators 11 to 13 respectively, and output the latched signals to Q terminals.

Each of the selectors 64 to 66 has three input terminals A0, A1, and A2, selects a value received through any of the three input terminals based on a signal that specifies a state selection target output from the selection control device 52, and outputs the selected signal. Here, each A0 terminal is connected to the D-type latch 61, each A1 terminal is connected to the D-type latch 62, and each A2 terminal is connected to the D-type latch 63. When the selection control device 52 outputs a signal specifying "state 1", the selector 64 outputs a value input through the A0 terminal. When the selection control device 52 outputs a signal specifying "state 2", the selector 65 outputs a value input through the A1 terminal. When the selection control device 52 outputs a signal specifying "state 3", the selector 66 outputs a value input through the A2 terminal.

The AND circuit 67 outputs a "HIGH" value when the counter circuit 71 has output a value "00" and the selector 64 has output a value input through the A0 terminal.

The AND circuit 68 outputs a "HIGH" value when the counter circuit 71 has output a value "01" and the selector 65 has output a value input through the A1 terminal.

The AND circuit 69 outputs a "HIGH" value when the counter circuit 71 has output a value "10" and the selector 66 has output a value input through the A2 terminal.

The OR circuit 70 outputs a "HIGH" value when any of the AND circuits 67 to 69 has output a "HIGH" value.

The counter circuit 71 increments the value it holds and outputs the value to Q0 and Q1 terminals each time the OR circuit 70 outputs a "HIGH" value.

The internal selection control signal output unit 72 outputs the internal selection control signal each time the counter circuit 71 outputs a value to Q0 and Q1 terminals.

With the above-described construction, each time any comparator detects a "match" and notifies the match detection signal control apparatus 53 of it, the match detection signal control apparatus 53 outputs a bus identification number that is next-higher than a current bus identification number, so that the data transferred on the bus with the identification number output from the match detection signal control apparatus 53 is output to the observation bus. That is to say, the internal bus whose data is output to the observation bus changes in rotation. Although in the present embodiment, the internal bus whose data is output to the observation bus changes in ascending order, the internal bus may be changed in descending order.

As described above, the present embodiment enables observers to observe the internal state of the system LSI 105 from outside by dynamically changing the internal observation state.

Embodiment 3

Figure 13:
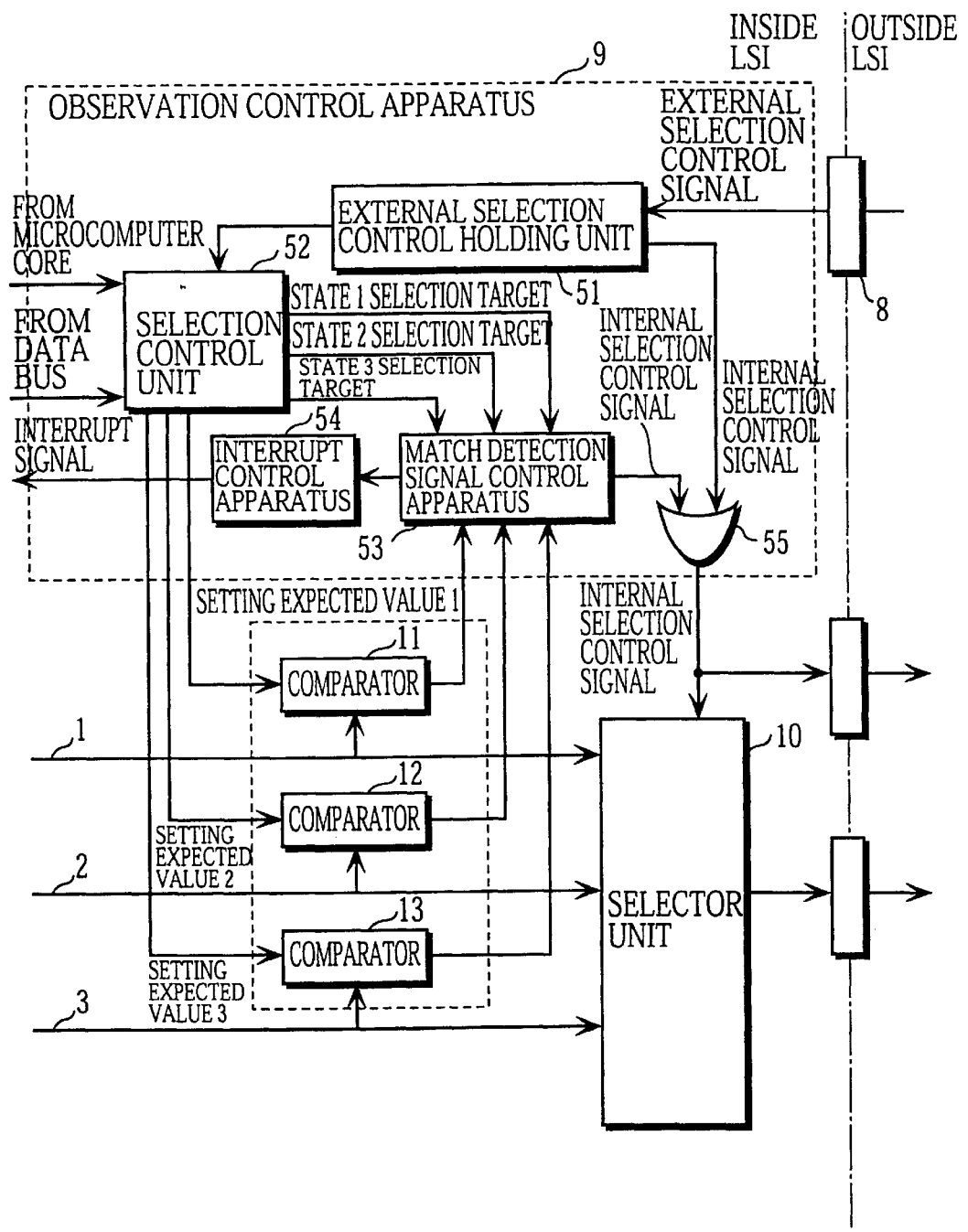
FIG. 13 shows the internal construction of the observation control apparatus 9 in Embodiment 3.

In Embodiment 3, when data on a bus is output to outside the system LSI 105, the identification number of the bus is also output to outside the system LSI 105. For this purpose, the internal selection control signal output from the OR circuit 55 is output to outside the system LSI 105. FIG. 13 shows the internal construction of the observation control apparatus 9 in Embodiment 3. As shown in FIG. 13, the internal selection control signal output from the OR circuit 55 is output to outside the system LSI 105 via an output terminal.

As described above, the present embodiment enables observers to recognize which internal bus is transferring the data which is currently output to outside the system LSI 105.

Embodiment 4

Embodiments 1 to 3 include the group of output terminals 7 used by the selector unit 10 to output data transferred on a bus to outside the system LSI 105 for the internal observation mode. Embodiment 4, however, does not include a dedicated group of output terminals, but uses output terminals prepared for other purposes also for the internal observation mode. The "output terminals prepared for other purposes" are those of the system LSI 105 used for outputting addresses to the flash memory 103, which are shown in FIG. 1.

Figure 14:
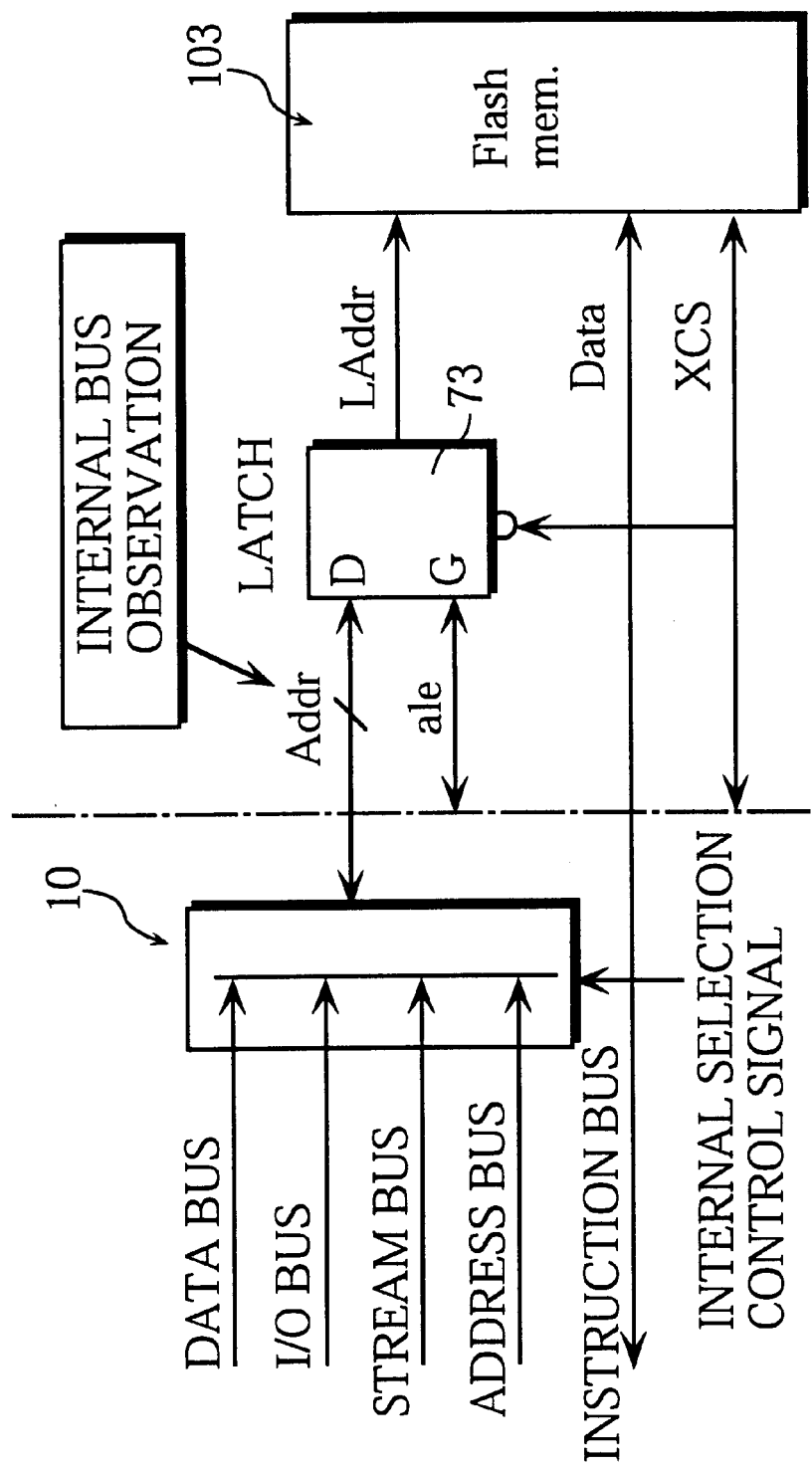
FIG. 14 shows how the selector unit 10 is connected to the system LSI 105 in Embodiment 4.

FIG. 14 shows how the selector unit 10 is connected to the system LSI 105 in Embodiment 4. In FIG. 4, "Addr" represents a connection line connecting the system LSI 105 and the flash memory 103 (refer to FIG. 2). In Embodiment 4, the connection line "Addr" connects the selector unit 10 and the flash memory 103. A latch circuit 73 is disposed in halfway through the connection line "Addr".

In Embodiment 4, the selector unit 10 is connected to four internal buses among the five internal buses, and is also connected to the observation bus.

The latch circuit 73 shown in FIG. 14 is a component unique to Embodiment 4, and its D terminal is connected to the selector unit 10. When the selector unit 10 outputs an address transferred on the address bus 4, the latch circuit 73 latches the address through the D terminal. The latch circuit 73 receives an ale signal through its G terminal. The latch circuit 73 continuously outputs the latched address to the flash memory 103 during a period in which the received ale signal is active.

Figure 15A:
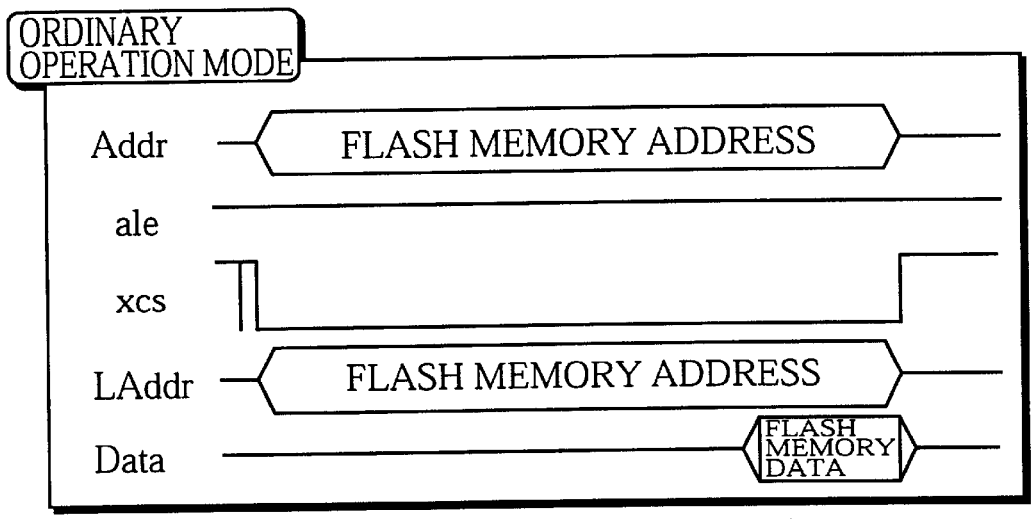
FIGS. 15A and 15B show timing charts respectively in the ordinary and internal observation mode.
Figure 15B:
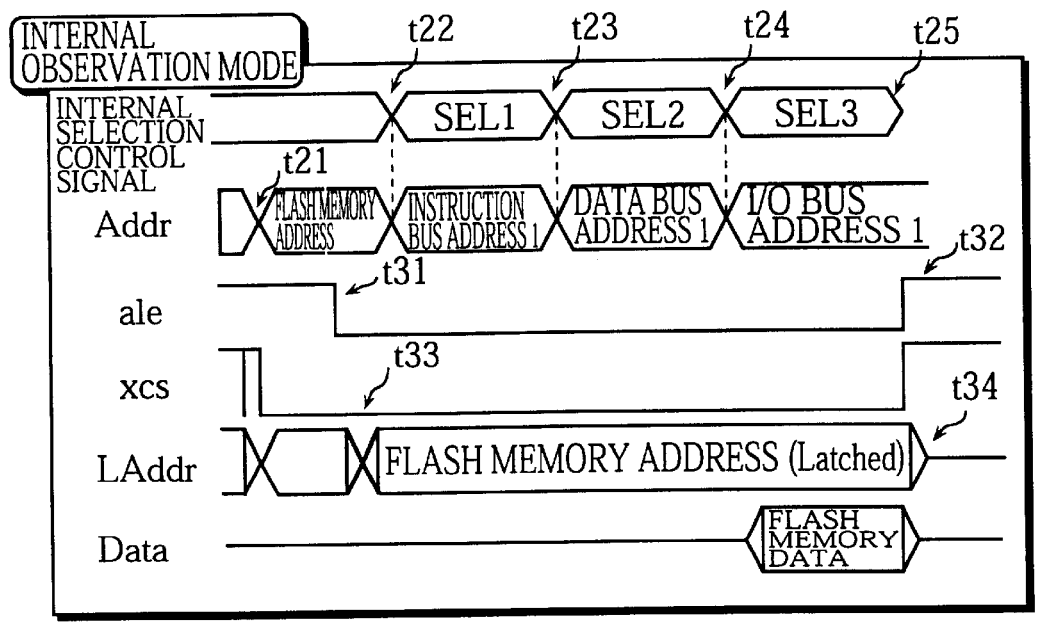

FIGS. 15A and 15B are timing charts in the ordinary operation mode and the internal observation mode, respectively. In these figures, the first row through the fifth row show the connection line "Addr", the ale signal, the XCS signal, addresses, and data, respectively.

In the ordinary operation mode, since the ale signal is HIGH (in the non-active state) from beginning to end, the latch circuit 72 outputs the flash memory address received from the selector 10, as it is.

In the internal observation mode, since the ale signal is LOW (in the active state) from time point t31 to time point t32, the latch circuit 73 continuously outputs a flash memory address through its output terminal during a period from time point t33 to time point t34. In this example, the internal selection control signals SEL1, SEL2, and SEL3 are output during a time period (1) (from time point t22 to time point t23), during a time period (2) (from time point t23 to time point t24), and during a time period (3) (from time point t24 to time point t25), respectively. As shown in FIG. 15B, during the time period (1), the connection line "Addr" has data transferred on the stream bus. Similarly, during the time periods (2) and (3), the connection line "Addr" has data transferred on the data bus and the I/O bus, respectively.

As described above, according to the present embodiment, an output terminal of the system LSI 105 used for outputting data to an external device can also be used by the selector unit 10 to output data transferred on a bus to outside the system LSI. This improves the cost performance of the system LSI 105.

Embodiment 5

In Embodiment 5, as is the case with Embodiment 2, one of a plurality of internal observation states is selected, and data transferred on a bus is output to outside the system LSI 105 in accordance with the selected internal observation state. While in Embodiment 2, comparators are connected to internal buses on a one-to-one basis, and the internal observation state changes each time any comparator detects a "match", in Embodiment 5, two comparators are connected to each internal bus, and the internal observation state changes each time the two comparators detect a "match".

Figure 16:
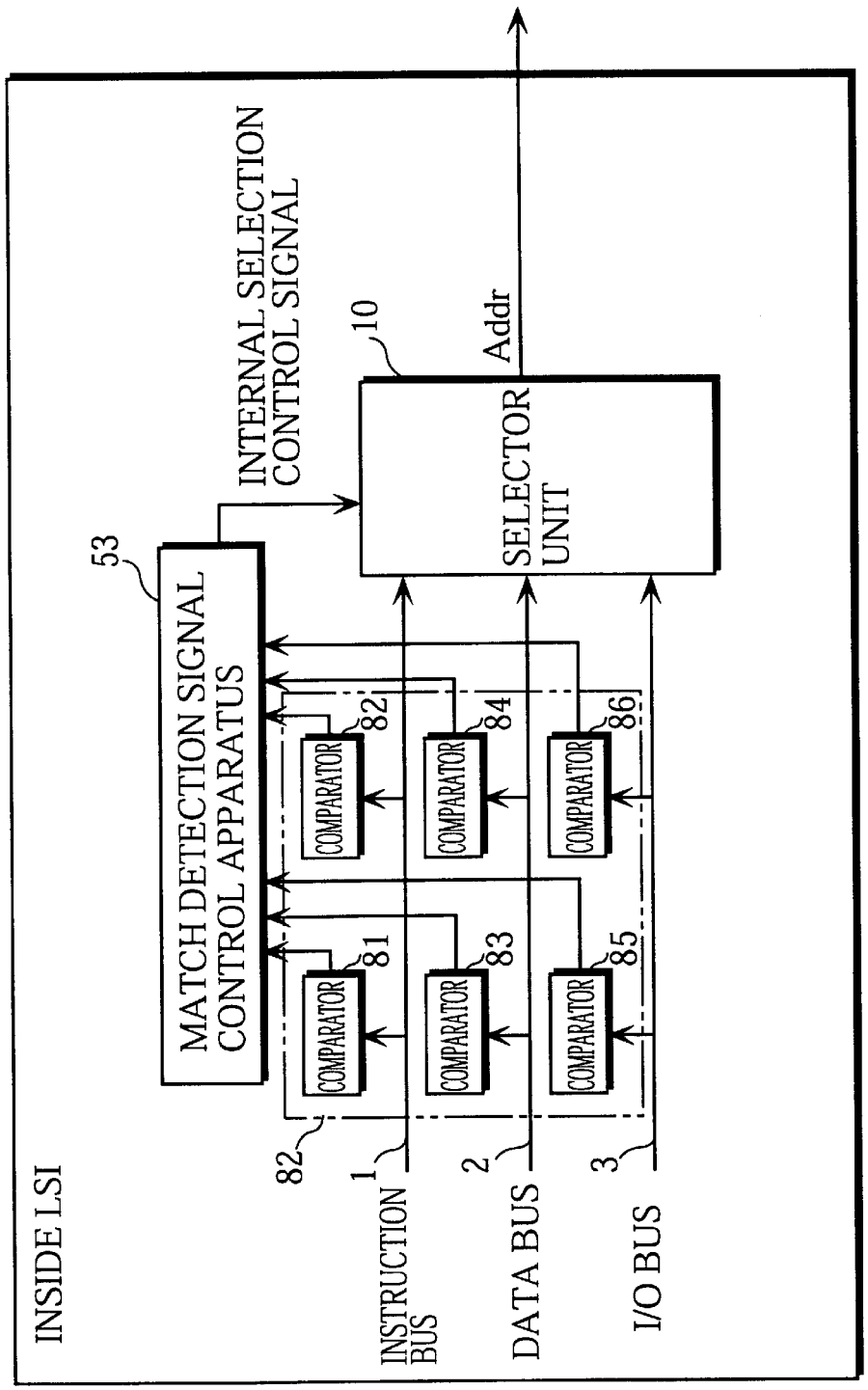
FIG. 16 shows the internal construction of the observation control apparatus 9 in Embodiment 5.

FIG. 16 shows the internal structure of the observation control apparatus 9 for achieving the above feature of Embodiment 5. As shown in FIG. 16, comparators 81 and 82 are connected to the instruction bus 1, comparators 83 and 84 are connected to the data bus 2, and comparators 85 and 86 are connected to the I/O bus 3. One of the two comparators connected to the same bus compares the data transferred on the bus with a first expected value to see whether they match, and. the other comparator compares the data with a second expected value to see whether they match.

Since each internal bus is connected to two comparators, in Embodiment 5, it is possible to change the internal observation state when a "specific sequence" occurs. Here, the "specific sequence" indicates a case where, for example, an internal bus becomes two different states in succession. Note that the "specific sequence" to be detected can be set and changed as desired through assignment of expected values in the comparators.

The match detection signal control apparatus 53 of the present embodiment first allows one of the two comparators connected to the same bus to compare the data transferred on the bus a certain expected value to see whether they match, and when they match, allows the other of the two comparators to compare the data with another expected value to see whether they match. The match detection signal control apparatus 53 then instructs the selector unit to output data transferred on another bus only when the results of both two comparisons are "match". Since two comparators are connected to each bus, for example, it is possible to selectively output data transferred on the data bus 1 to outside the system LSI 105 only when the first address and the second address, which are determined in advance, appear on the address bus 4 in succession.

As described above, in the present embodiment, since two comparators are connected to each bus, it is possible to change data to be output to outside even when the expected value cannot be rewritten in time due to a very short period between the transfers of the first address and second address, for example. Although in the present embodiment, as is the case with Embodiment 2, a plurality of internal observation states are rotated, an internal selection control signal may be output by referring to a table showing relationships between comparators and buses, as in Embodiment 1.

As a variation of the present embodiment, data transferred on one of a plurality of internal buses may be output to outside the system LSI 105 when one of two comparators connected to the same bus detects a match between the data and an expected value. Also, while in the present embodiment, the data to be output to outside is changed when a "specific sequence" in the same internal bus is detected, the data may be changed when a "specific sequence" in two internal buses is detected. More specifically, two comparators connected to two buses are used to detect whether one of the two buses becomes a certain state and immediately after this, the other of the two buses becomes another state. Whether the data to be output to outside should be changed is determined based on these check results.

Embodiment 6

Figure 17:
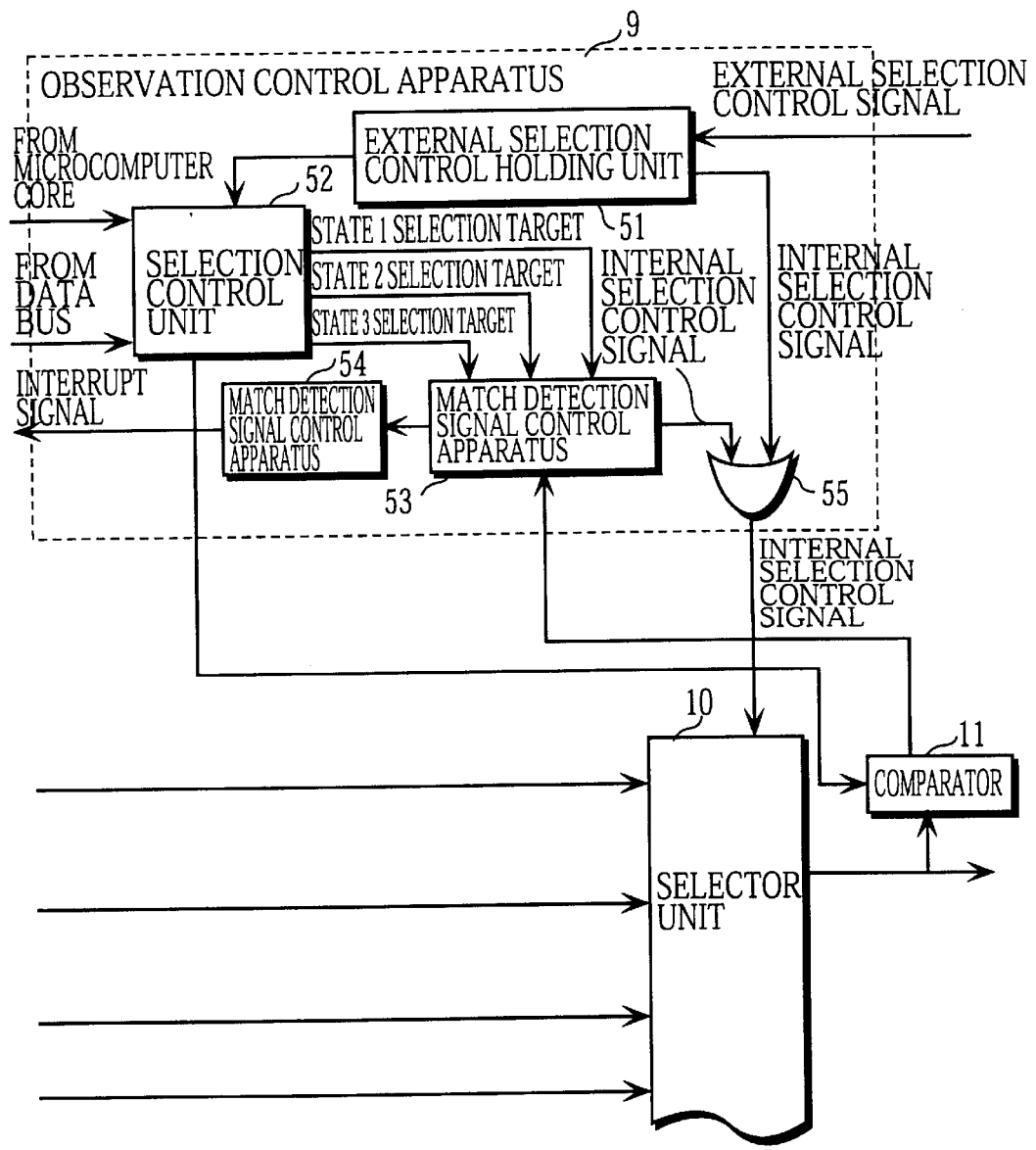
FIG. 17 shows the internal construction of the observation control apparatus 9 in Embodiment 6.

In Embodiments 1 to 3, the comparator 11 is connected to an internal bus. In Embodiment 6, the comparator 11 is connected to the observation bus on which the data selected by the selector 10 is transferred. FIG. 17 shows the internal structure of the observation control apparatus 9 in Embodiment 6.

The system integrated circuit in Embodiment 6 including the above feature operates as follows. After the selector 10 starts outputting data transferred on any internal bus to the observation bus, the comparator 11 connected to the observation bus continuously judges whether the data matches an expected value. The match detection signal control apparatus 53 does not output the internal selection control signal unless the comparator judges that the data matches the expected value. This allows the selector 10 to continue to output this data unless it receives the internal selection control signal.

The match detection signal control apparatus 53 outputs the internal selection control signal when the comparator 11 has judged that the data on the observation bus matches the expected value. When the internal selection control signal indicates an identification number of another internal bus, the selector 10 starts outputting data transferred on the other internal bus to the observation bus. As described above, in Embodiment 6, the same data continues to be output to the observation bus unless a certain expected value appears on the observation bus, and data transferred on another bus is output to the observation bus after the certain expected value appears on the observation bus.

As described above, since the present embodiment uses only one comparator, the circuit size of the system LSI 105 is reduced.

Embodiment 7

Figure 18:
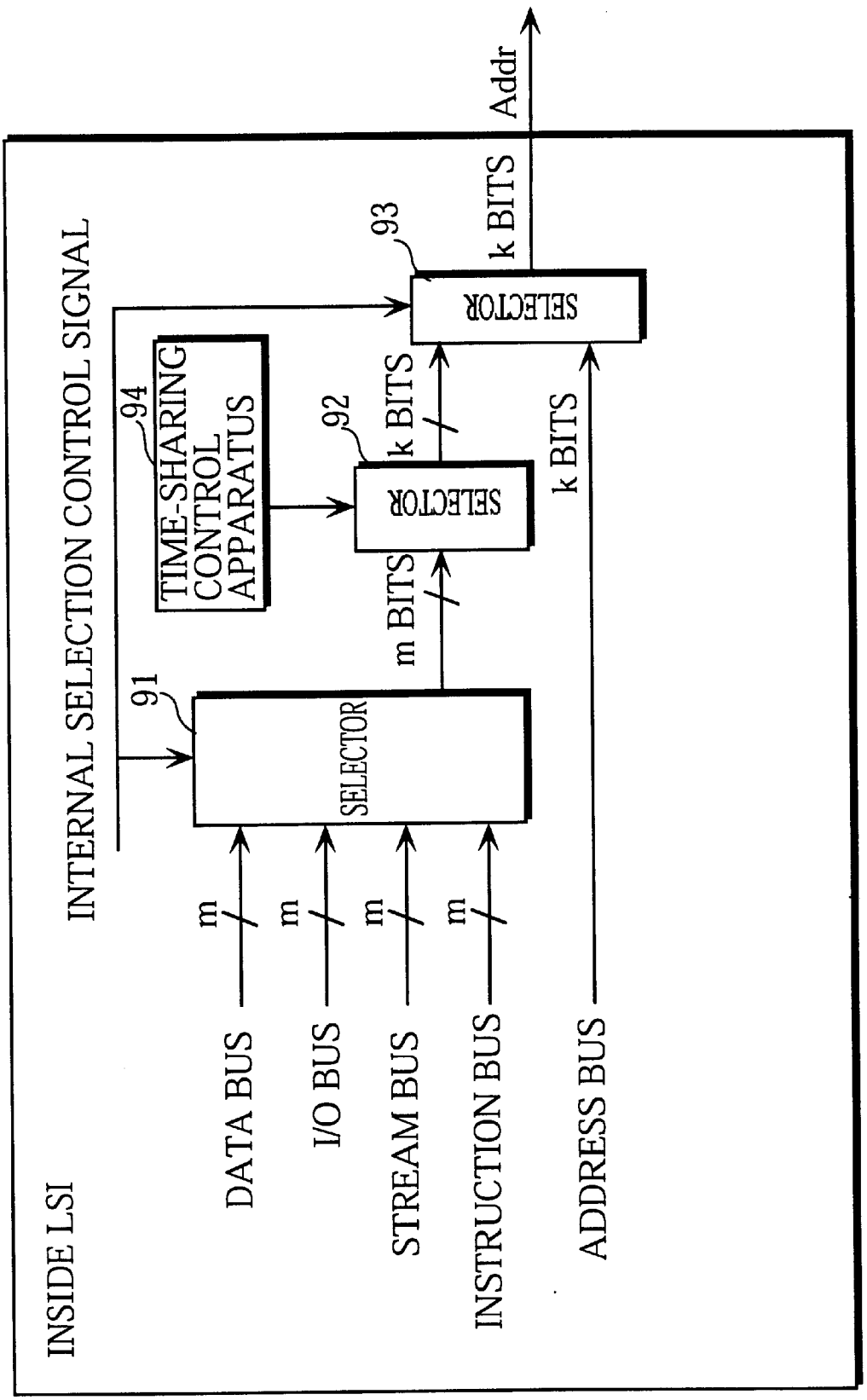
FIG. 18 shows the internal construction of the observation control apparatus 9 in Embodiment 7.

Embodiment 7 is characterized in that data transferred on an internal bus is output to outside the system LSI 105 in time-sharing, in contrast to Embodiments 1 to 3. FIG. 18 shows the internal structure of the observation control apparatus 9 in Embodiment 7.

Suppose, as shown in FIG. 18, that the bit width of each of the data, I/O, stream, and instruction buses is m bits, that the number of output terminals contained in the system LSI 105 is k, and that the bit width of the address bus is k bits, where k<m. Then, the selector unit receives (4×m) bits of data from the data, I/O, stream, and instruction buses, and outputs data to outside the system LSI 105 on a k bits at a time basis in time-sharing. With this construction, even if the number of output terminals is less than the bit width of the bus to be observed, all the data transferred on a bus can be observed.

Embodiment 8

Figure 19:
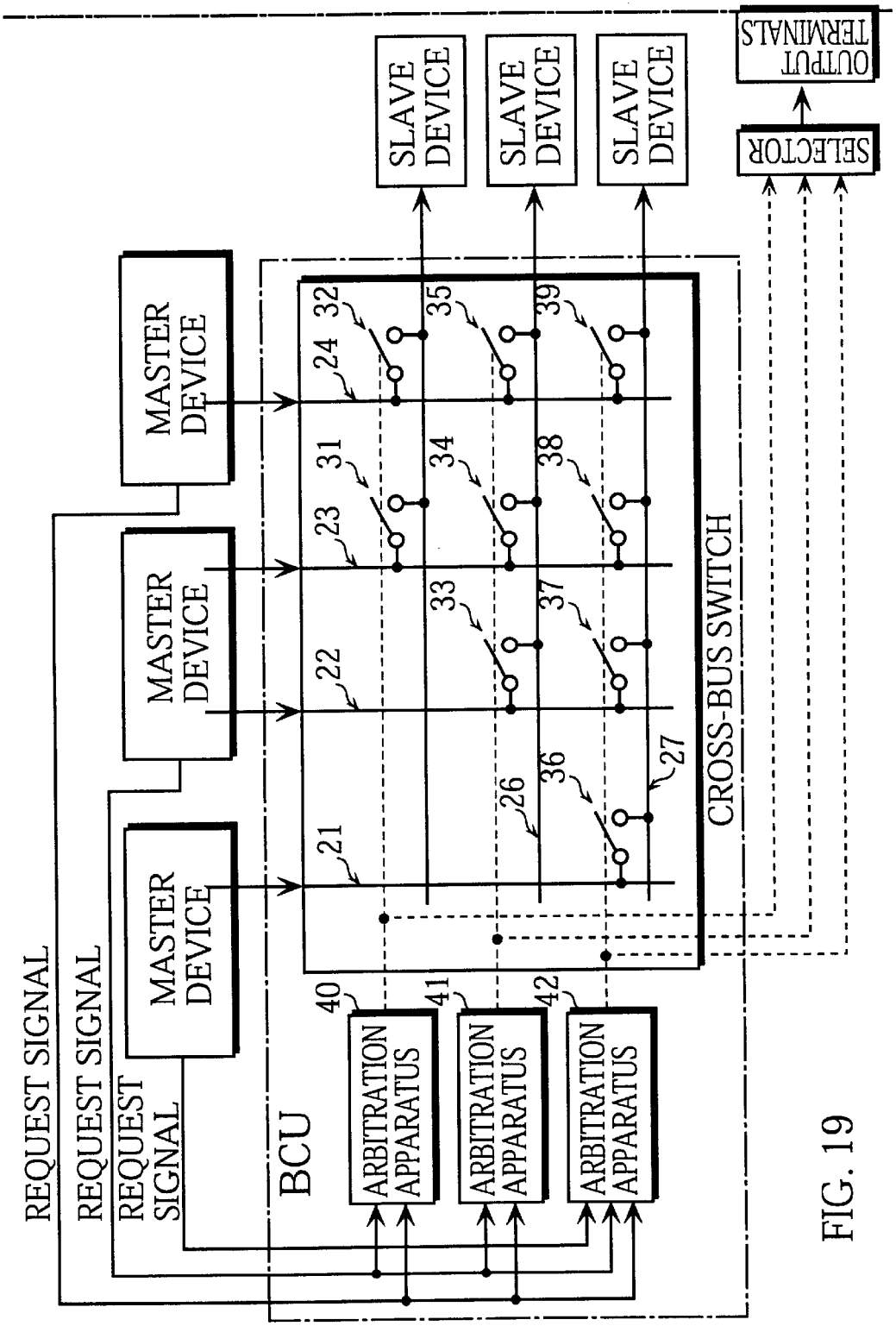
FIG. 19 shows the internal construction of the BCU 117 in Embodiment 8.

While in Embodiments 1 to 3, data transferred on an internal bus is output to outside the system LSI 105, in Embodiment 8, when a contention occurs between two or more master devices for a bus, a request signal output from each contending master device to the arbitration apparatuses 40 to 42 is output to outside the system LSI 105. FIG. 19 shows the internal construction of the BCU 117 in Embodiment 8.

As shown in FIG. 19, each master device outputs a request signal to the arbitration apparatuses 40 to 42 to request use of a slave device.

The arbitration apparatuses 40 to 42, when receiving a plurality of request signals from a plurality of master devices, select one of the plurality of master devices in accordance with a certain procedure, and vest the selected master device with the right to use a bus.

The selector unit 10 in Embodiment 8 outputs a request signal output from the master device vested by the arbitration apparatuses 40 to 42 to use a bus to outside the system LSI 105.

As described above, in the present embodiment, when a contention occurs in the system LSI 105 between two or more master devices for a bus, an observer can recognize from outside the system LSI 105 which master device the arbiters have allowed to use a bus.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A system integrated circuit containing a plurality of buses, comprising:

a plurality of comparators operable to compare data transferred on one of the plurality of buses with a predetermined expected value, the plurality of comparators being connected to the plurality of buses on a one-to-one basis, each comparator having a unique expected value, and comparing the expected value with data transferred on a bus corresponding to the comparator;

a selector unit operable to output data transferred on one of the plurality of buses to outside the system integrated circuit in accordance with a result of the comparison performed by the comparator;

a storage unit operable to store one or more pieces of designation information which correspond to one or more comparators among the plurality of comparators on a one-to-one basis, each piece of designation information designating a target bus which is different from a bus connected to a comparator corresponding to the piece of designation information; and when any comparator judges that the expected value thereof matches data transferred on a bus connected to the comparator, the selector unit outputs data transferred on a target bus designated by a piece of designation information corresponding to the comparator;

the interrupt signal outputting unit operable to output an interrupt signal after any comparator has judged that the expected value thereof matches data transferred on a bus connected to the comparator; and a processing unit operable to execute a predetermined process and after the interrupt signal outputting unit outputs an interrupt signal, execute a debug process prepared for a debug by the system integrated circuit.

2. The system integrated circuit of claim 1, wherein each of the plurality of comparators includes
a holding unit operable to hold an expected value, and the system integrated circuit further comprises
an update unit operable to update an expected value held by each holding unit.

3. The system integrated circuit of claim 1 further comprising:

an output unit operable to output, when the selector unit outputs data transferred on a bus corresponding to the comparator to outside the system integrated circuit, an identification number of the bus to outside the system integrated circuit.

4. The system integrated circuit of claim 1, wherein the selector unit continues to output data transferred on the bus connected to the comparator to outside the system integrated circuit when the comparator judges that the predetermined expected value does not match the data, and the selector unit outputs data transferred on another bus to outside the system integrated circuit when the comparator judges that the predetermined expected value matches the data transferred on the bus to which the comparator is connected.

5. The system integrated circuit of claim 4, wherein the plurality of buses include an external-device-dedicated bus which is used to transfer either a predetermined kind of data or a predetermined address to be output to an external device connected to the system integrated circuit, and the selector unit continues to either the output either the predetermined kind of data or the predetermined address to outside the system integrated circuit when the comparator judges that the predetermined expected value does not match the data, and the selector unit outputs data transferred on another bus to outside the system integrated circuit when the comparator judges that the predetermined expected value matches the data transferred on the bus to which the comparator is connected.

6. The system integrated circuit of claim 4, wherein each of the plurality of comparators includes
a holding unit operable to hold an expected value, and the system integrated circuit further comprises
an update unit operable to update an expected value held by each holding unit.

7. The system integrated circuit of claim 4 further comprising:

an interrupt signal outputting unit operable to output an interrupt signal after any comparator has judged that the expected value thereof matches data transferred on a bus connected to the comparator; and a processing unit operable to execute a predetermined process and after the interrupt signal outputting unit outputs an interrupt signal, execute a debug process prepared for a debug by the system integrated circuit.

8. The system integrated circuit of claim 4 further comprising:

an output unit operable to output, when the selector unit outputs data transferred on a bus corresponding to the comparator to outside the system integrated circuit, an identification number of the bus to outside the system integrated circuit.

9. A system integrated circuit containing a plurality of buses, comprising:

a comparator operable to compare data transferred on one of the plurality of buses with a predetermined expected value;

a selector unit operable to output data transferred on one of the plurality of buses to outside the system integrated circuit in accordance with a result of the comparison performed by the comparator;

a receiving unit, operable to receive data from outside the system integrated circuit; and a judgement unit operable to judge whether the data received by the receiving unit either is a default value or includes a designation of a bus transferring data which should be output, and the selector unit outputs data transferred on another bus to outside the system integrated circuit when the data received by the receiving unit is the default value, and when the data received by the receiving unit includes the designation of a bus, the selector unit outputs data transferred on the bus designated by the data received by the receiving unit.

10. The system integrated circuit of claim 1, wherein each of the plurality of buses is m bits wide, the system integrated circuit comprising k output terminals (k<m), and the selector unit outputs k bits out of m bits to the k output terminals, and then rest of the m bits to the k output terminals.

11. A system integrated circuit containing a plurality of buses comprising:

a comparator operable to compare data transferred on one of the plurality of buses with a predetermined expected value;

a selector unit operable to output data transferred on one of the plurality of buses to outside the system integrated circuit in accordance with a result of the comparison performed by the comparator;

a demultiplex unit operable to receive a transport stream into which a plurality of elementary streams have been time-division multiplexed, and separates the received transport stream into the plurality of elementary streams; and a decoder unit operable to decode the plurality of elementary streams, wherein the plurality of buses include a stream bus which is used to transfer the plurality of elementary streams between the demultiplex unit and the decoder unit, and when the comparator judges that data transferred on the stream bus matches the predetermined expected value, the selector unit outputs data transferred on another bus.

12. The system integrated circuit of claim 11 being connected to a first memory apparatus, and further comprising:

a direct memory access transfer control unit operable to, by transferring the plurality of elementary streams on the stream bus, either write a stream of data from the demultiplex unit to the first memory apparatus, or read a stream of data from the first memory apparatus to the decoder unit.

13. The system integrated circuit of claim 12 further being connected to a second memory apparatus which stores a sequence of instructions, and further comprising a processor unit operable to execute an instruction and control the system integrated circuit, wherein the plurality of buses include:

an address bus which is used to transfer an access destination address from the processor unit to the second memory apparatus; and an instruction bus which is used to transfer an instruction from the second memory apparatus to the processor unit, and when the comparator judges that data transferred on either the address bus or the instruction bus matches the predetermined expected value, the selector unit outputs data transferred on another bus.

14. The system integrated circuit of claim 13, wherein the first memory apparatus is used as a work area when the processor unit executes an instruction stored in the second memory apparatus, the system integrated circuit further comprising an arbitration unit operable to, when a contention occurs between the direct memory access transfer control unit and the processor unit for an access to the first memory apparatus, allow one of the direct memory access transfer control unit and the processor unit to access the first memory apparatus, and prohibit the other from accessing.

* * * * *